(12) United States Patent
Pollard et al.

(10) Patent No.: US 6,259,826 B1
(45) Date of Patent: Jul. 10, 2001

(54) IMAGE PROCESSING METHOD AND DEVICE

(75) Inventors: Stephen Bernard Pollard, Dursley; Richard Oliver Kahn, Bristol, both of (GB)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/086,304

(22) Filed: May 28, 1998

(30) Foreign Application Priority Data

Jun. 12, 1997 (EP) .................................................. 97304101

(51) Int. Cl.[7] ...................................................... G06K 9/36
(52) U.S. Cl. ............................ 382/284; 382/294; 358/450
(58) Field of Search .................................. 382/284, 294, 382/450, 313, 240; 358/473, 474

(56) References Cited

U.S. PATENT DOCUMENTS

| | | |
|---|---|---|
| 4,272,756 | 6/1981 | Kakumoto et al. . |
| 4,797,544 | 1/1989 | Montgomery et al. . |
| 4,901,163 | 2/1990 | Tsujioka et al. . |
| 4,944,023 * | 7/1990 | Imao et al. .............................. 382/240 |
| 4,947,447 * | 8/1990 | Miyaoka et al. ....................... 382/240 |
| 5,140,647 | 8/1992 | Ise et al. . |
| 5,228,098 * | 7/1993 | Crinon et al. .......................... 382/240 |
| 5,306,908 | 4/1994 | McConica et al. . |
| 5,355,146 | 10/1994 | Chiu et al. . |
| 5,578,813 | 11/1996 | Allen et al. . |
| 5,611,033 | 3/1997 | Pitteloud et al. . |
| 5,644,139 | 7/1997 | Allen et al. . |
| 5,675,672 | 10/1997 | Nakabayashi . |
| 5,686,960 | 11/1997 | Sussman et al. . |
| 5,729,008 | 3/1998 | Blalock et al. . |
| 5,787,889 | 8/1998 | Edwards et al. . |
| 5,825,044 | 10/1998 | Allen et al. . |
| 5,930,411 | 7/1999 | Kojima et al. . |
| 5,999,189 * | 12/1999 | Kajiya et al. .......................... 345/430 |

FOREIGN PATENT DOCUMENTS

| | | |
|---|---|---|
| 38 23 622 | 1/1989 | (DE) . |
| 3823622 | 1/1989 | (DE) . |
| 0 388 282 | 9/1990 | (EP) . |
| 0388282 | 9/1990 | (EP) . |
| 0651552 | 5/1995 | (EP) . |
| 0698991 | 2/1996 | (EP) . |
| 0 730 366 | 9/1996 | (EP) . |
| 0730366 | 9/1996 | (EP) . |
| 2 586 497 | 2/1987 | (FR) . |
| 2586497 | 2/1989 | (FR) . |
| 2288512 | 10/1995 | (GB) . |
| 90/05962 | 5/1990 | (WO) . |
| 93/12501 | 6/1993 | (WO) . |
| 96/27257 | 9/1996 | (WO) . |

OTHER PUBLICATIONS

Foley, James D. et al., *Computer Graphics Principles and Practice*, Second Edition, Addison–Wesley Publishing Company, Reading Massachusetts, 1990, pp. 72–81.

(List continued on next page.)

Primary Examiner—Amelia M. Au
Assistant Examiner—Jingge Wu

(57) ABSTRACT

A method of reconstructing an image captured as a stream of image data, for example as input received from a linear sensor in unconstrained scanning, comprises reconstructing the image in the form of a plurality of tiles. Each tile comprises a pixel grid of predetermined dimension representing a specific spatial region of the image. The tiles tessellate a rectilinear image space. Tiles can be created when required and compressed when no longer active, thus minimizing memory requirements. Devices utilizing this method are provided. The method is especially appropriate for use in an unconstrained hand scanner, but can also be applied to panoramic capture with a digital camera.

28 Claims, 20 Drawing Sheets

OTHER PUBLICATIONS

Pratt, William K., *Digital Image Processing*, Second Edition, John Wiley and Sons, Inc., 1991, pp. 597–600.

Szeliski, Richard, "Video Mosiacs for Virtual Environments", *IEEE Computer Graphics and Applications*, Mar. 1996, pp. 22–30.

Wolberg, *Digital Image Warping*, IEEE Computer Society Press Monograph, pp. ii–iv, 117–161, 187–204 (1964).

Baird, "The Skew Angle of Printed Documents," *SPSE Symposium on Hybrid Imaging Systems*, pp. 21–24 (1987).

* cited by examiner

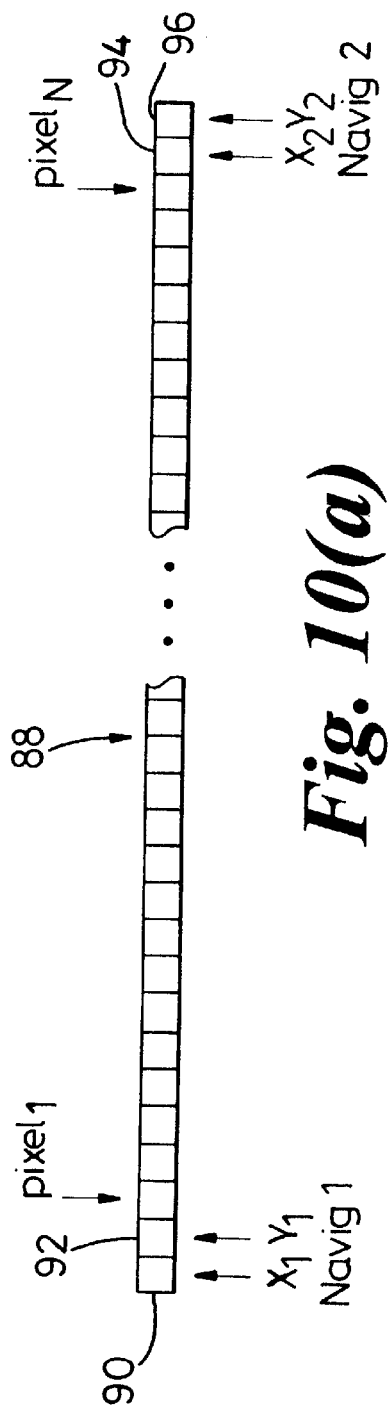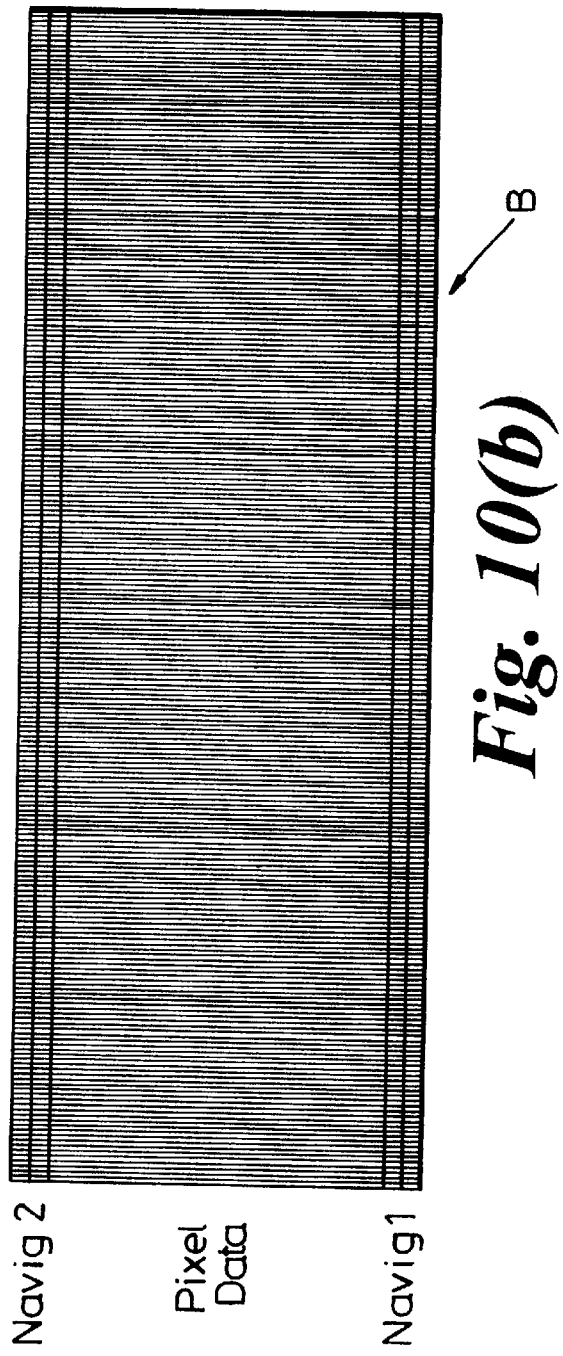
Fig. 10(a)
Fig. 10(b)

Per increment tile indices table

Complete tile indices table N

IMAGE PROCESSING METHOD AND DEVICE

TECHNICAL FIELD

The present invention relates to image processing methods and associated devices relating to the reconstruction of an image captured as image data. The present invention is particularly applicable to images captured by a scanner, especially a hand scanner adapted for movement across a surface in an unconstrained manner.

BACKGROUND ART

Scanners for electronically forming an image of an original are known. Typically, the captured image provided by a scanner is a pixel data array that is stored in memory in a digital format. A distortion-free image requires a faithful mapping of the original image to the pixel data array. Scanners typically use mechanical constraint during the image capture process in order to maximize the likelihood of faithful mapping. Types of scanners known in the art include drum scanners, flatbed scanners, two-dimensional array scanners, sheet-fed scanners and hand scanners. The present invention is particularly applicable to hand scanners.

Conventional hand scanners require a user to move a linear array of electrooptical sensor elements over an original. The movement is generally by hand manipulation, but in some embodiments is motor driven. Array-position information is determined using methods such as those employed in operation of a computer "mouse." As a linear sensor array is moved, the rotation of wheels, balls or rollers that are in contact with the original is sensed, and the position information is determined from the mechanical details of the rotation. In general, the surface of the mechanical element in contact with the original has a high coefficient of friction, e.g. rubber, so as to resist slip and skid. A cylindrical roller or two wheels connected by a rigid axle may be used to enforce a single translational degree of freedom during the scanning process. A straight-edge or other fixture is often used to fix the scan direction with respect to the original and to further enforce the translational constraint provided by the pair of wheels or the roller. Nevertheless, the position encoder approach is one that is often susceptible to slips and skips, so that the pixel data array loses its correspondence with the image on the original.

Hand scanners are typically connected directly to a separate computer for image data storage, processing, and use. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, with the mechanical resistance increasing with increases in scanning speed.

Hand scanners utilize relatively small imaging arrays and generally cannot handle larger than A6 documents in a single pass. This requires stitching algorithms to join together multiple swaths of a larger document. Swath stitching may be done in a separate operation by a separate computer. Scanning a multi-page business document or report with a hand scanner is a tedious process that often yields low-quality results. Techniques for stitching image swaths are known in the scanning art. These techniques typically require a pair of complete image swaths and produce a single, global transformation which brings the two swaths into registration. Improved techniques are taught in the International Patent Application Publication No. WO 96/27257.

As previously noted, some type of fixture is typically used with a hand scanner. In the absence of a fixture, there is a tendency to impose some rotation as the hand scanner is moved across an original. If the user's elbow is resting on a flat surface during movement of the scanner, the rotation is likely to have a radius defined by the distance between the scanner and the user's elbow. As a consequence, the scanned electronic image will be distorted. Other curvilinear movements during a swath of the scanner will also create distortions.

In forming a scanned electronic image it is necessary to acquire navigation information that is acquired along with image data. A hand scanner in which navigation information is obtained without compromise to ease of use of the scanner is described in U.S. Pat. No. 5,578,813. The navigation information is acquired by means of at least one navigation sensor that detects inherent structure-related properties of an original being scanned. Movement of an image sensor along the original is tracked by monitoring variations of the inherent structure-related properties as the image sensor is moved relative to the original. The inherent structure-related properties that are monitored are inherent structural features, such as paper fibers, or other constituents of the original. Navigation can alternatively be speckle-based, wherein movement of the image sensor along the original is tracked by monitoring variations of speckle patterns produced using coherent illumination for acquiring the navigation information. Movement of the scanner across the surface of the image to be scanned can thus be essentially arbitrary, as it is not constrained.

"Inherent structure-related properties" are properties of the original that are attributable to factors that are independent of forming image data and/or of systematic registration data on the original. The navigation information may be formed by generating a position signal that is responsive to detection of inherent structure-related properties, such as a position signal of speckle information or a position signal that permits tracking of individual inherent structural features. "Inherent structural features" are those features of an original that are characteristic of processes of forming the original and are independent of forming image data and/or systematic registration data on the original. For example, if the original recorded media is a paper product, the inherent structural features of interest may be paper fibers. As another example, navigation of the image sensor across a glossy original or an overhead transparency film may be determined by tracking surface texture variations that affect specular fields. Typically, the inherent structural features are microscopic, e.g. between 10 and 40 $\mu$m, features of surface texture.

The present invention is directly applicable to hand scanners as taught in International Patent Application Publication No. WO 96/27257 and U.S. Pat. No. 5,578,813, both of which applications are incorporated herein by reference to the extent that this is permissible by national law.

Processing problems are caused by the unconstrained nature of input in many of the embodiments set out in the above prior art documents. In order to be sure that the pixel array for the reconstructed image will be capable of representing all the data captured, it is necessary for it to be relatively large. As data capture could begin at any point on the image, in conventional structures it would be necessary to use a pixel grid several times larger than the image to be captured. It is necessary with such an approach to allocate considerable memory to storage of pixel array data, thus significantly increasing expense.

The present invention aims to provide a method that significantly reduces the memory requirements for storing an image captured in such an unconstrained manner. In particular aspects, the invention provides for reduction of the computational cost and increases the speed of forming a reconstructed image from an arbitrarily obtained captured image. The method is particularly directed to freehand scanning, and freehand scanning devices.

SUMMARY OF THE INVENTION

According to the present invention we provide a method of reconstructing an image from a plurality of image elements, each image element comprising image data captured in an image sensor and position data indicating a position of that image element with respect to others of the image elements, the method comprising reconstructing the image in the form of a plurality of tiles, each tile comprising a pixel grid of predetermined dimension representing a specific spatial region of the image.

This position data may be derived from navigation means which provides the position data for an image element on capture of that image element by an image sensor. This is particularly advantageous where a linear sensor is used to capture data. In other aspects of the invention, the position data is derived from a preceding step of determining from features of the image elements a relative position for each image element with respect to others of the image elements. This is particularly advantageous where data is captured with an area sensor, and it becomes possible to assess relative positions of captured data by evaluation of overlapping areas.

Advantageously, the tiles are contiguous, do not overlap, and are adapted to tessellate in two dimensions. The method is particularly appropriate where the image is captured in the form of a stream of sensor readings, each sensor reading comprising image data and corresponding position data. Such data capture occurs in the case of freehand scanning with a linear sensor scanned across an image surface.

The method is especially appropriate to unconstrained input obtained from an arbitrary scanning path across the image. This is because tiles may be created at any position required, but need not be created until they are actually required. In a preferred embodiment, the method comprises the steps of: managing tiles by determining from the position data if tiles exist corresponding to the spatial positions of a group of input sensor readings in the image, and by creating one or more new tiles as necessary so that tiles corresponding to the spatial positions of the group exist; and writing to tiles by assigning pixel values to the pixels of tiles corresponding to the spatial positions of the input sensor readings of the group on the basis of the image data and the position data; wherein said steps are repeated for successive groups of sensor readings.

In preferred embodiments, the method includes creating a tile index indexing each tile created with its specific spatial region of the image. Advantageously, the tile index is provided as a tree, with each node of the tree pointing to a plurality of locations at a multiple of the spatial resolution of that node.

In a further advantageous aspect of the invention, tiles which have been written to can be compressed while image capture is still proceeding. Advantageously, in the tile managing step the tiles corresponding to the spatial positions of a previous group operated on are compared with the tiles corresponding to the spatial positions of a present group, and wherein newly required tiles are created and wherein tiles of the previous group not present in the present group are compressed. The tiles which are compressed are written to a compressed tile storage area and are deleted from an active tile buffer holding tiles of the present group.

The invention further comprises scanning devices adapted to carry out methods as set out above. When the present invention is implemented in a hand scanner which has sufficient computing power to do all of the processing, the method comprises using error estimates to feedback corrections to the navigation device. An exemplary form of these error estimates and their application is discussed in detail below with respect to an embodiment of the invention. Thus, in real time, errors are identified and used to correct the navigation device itself as well as to correct errors in the image being reconstructed. Alternatively, the present invention may be implemented in a scanning device for collecting image data and which is designed for interconnection to a computer system for performing a method according to the present invention.

A scanning device according to the invention will be described. The device may have the computing power to perform the processing required by a method according to the present invention or, alternatively, the device may be designed for interconnection to a computer system for performing a method according to the present invention.

In the embodiment to be described, the reconstruction of a captured image includes using navigation information that is acquired along with image data, and then rectifying the image data based upon the navigation and image information. Rectification is a process of using navigation data to arrange acquired image data to achieve conformance between original and output images. In a preferred embodiment, the navigation information is acquired by means of at least one navigation sensor that detects inherent structure-related properties of an original being scanned. Movement of an image sensor along the original may be tracked by monitoring variations of the inherent structure-related properties as the image sensor is moved relative to the original. The inherent structure-related properties that are monitored are inherent structural features, such as paper fibers, or other constituents of the original. Navigation may also be speckle-based, wherein movement of the image sensor along the original is tracked by monitoring variations of speckle patterns produced using coherent illumination for acquiring the navigation information.

Thus, the contemplated approaches to acquiring navigation information vary in scope. In the broadest approach, there is no limitation to the sources of navigation information that are to be used to remove distortion artifacts of curvilinear and rotational movement of the scanning device along a scan path. The navigation signal may therefore be in the form of a position signal that is responsive to detection of image data on the original (e.g., identification of edges of text characters), with the position signal then being used in the manipulation of an image signal. A second approach is one in which a position signal is responsive to detection of inherent-structure related properties, such as the properties that determine speckle patterns. The third approach is to track navigation of the scanning device by monitoring the positions of individual inherent structural features (e.g., paper fibers) over time.

In the embodiments to be described the image sensor is a linear array of electrooptical elements, while the navigation approach utilizes at least one two-dimensional array of navigation sensor elements. By placing a separate two-dimensional navigation array at each end of the image sensor, the scanner is afforded three degrees of freedom of movement. If the original is planar, two of the degrees of freedom are translational and are perpendicular to each other within the plane of the original, while the third degree of freedom is rotational about the normal to the plane of the original. The accuracy of rotation tracking is enhanced by the use of two navigation arrays, with each array having a smaller array extent than would be necessary if only a single navigation array were used. While the described embodiment is one in which a navigation sensor is a two-dimensional array, linear arrays may also be used. Navigation information for rectifying image data could feasibly be acquired by fixing other position-tracking means to the scanning device in manners independent of any inherent structure-related properties of the original.

The navigation sensors are in a known position relative to the image sensor. Preferably, the navigation sensors are as close to the end points of the imaging sensor as possible, so that the navigation sensors are less susceptible to travelling beyond the edge of an original as the image array is moved. The image sensor forms a signal that is representative of an image of interest. Simultaneously, each navigation sensor forms a signal representative of the inherent structure-related properties of the original. The scanning device may be moved in a freehand meandering pattern, such as one of alternating left-to-right and right-to-left movements with descent along the original, with the device remaining in contact with the original. Each one of the side-to-side swaths should overlap a portion of the previous swath, so that the image may be manipulated with respect to position and stitched either during or following the scanning process. The manipulation of the image signal is a rectification of image data, with the rectification being based upon the relative movement between the navigation sensor or sensors and the inherent structure-related properties detected by the navigation sensors. Stitching is a process used to connect image data acquired during successive swaths such that the positional relationship between data in separate swaths conforms, after stitching, to the positional relationship between those image data in the original image.

Further aspects of sensor design and image processing methods with which the present invention may be employed are discussed in International Patent Application Publication No. WO 96/27257 and U.S. Pat. No. 5,578,813.

BRIEF DESCRIPTION OF THE DRAWINGS

FIG. 10a is a representation of an increment of a position-tagged data stream typical of the output from the navigation processor of FIG. 9(a).

FIG. 10b is a representation of a buffer storing a multitude of position-tagged data increments;

FIG. 12b shows an index tree corresponding to the tile index of FIG. 12a;

FIGS. 17 and 17A shows a rectilinear image space showing the locus of the end points of the samples from the linear image sensor;

BEST MODE FOR CARRYING OUT THE INVENTION

Figure 1:
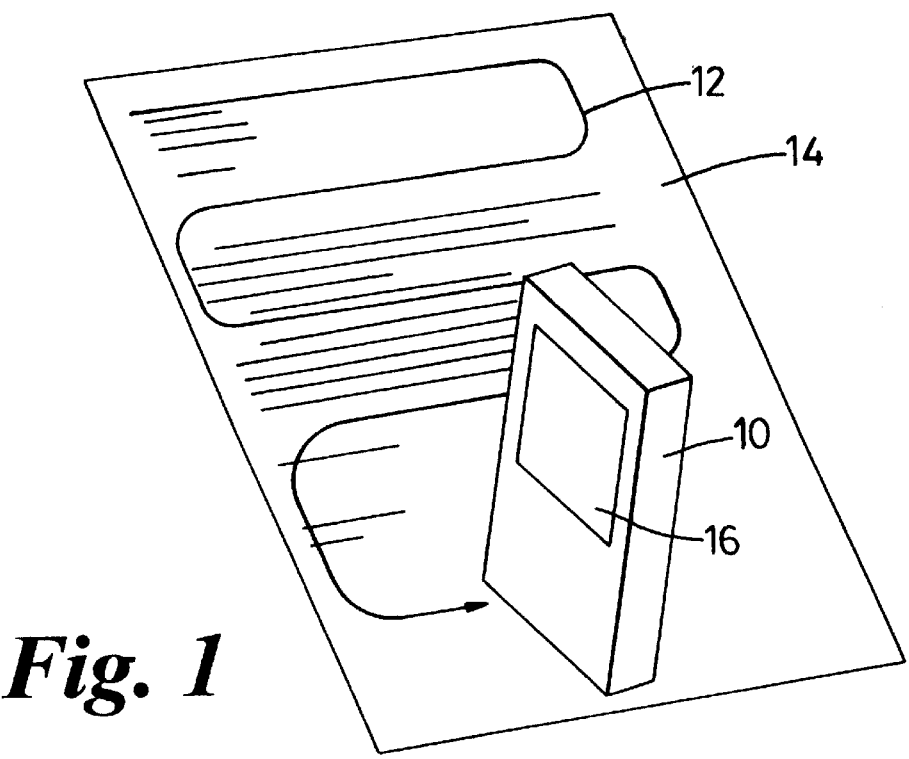
FIG. 1 is a perspective view of a hand-held scanning device following a meandering path on an original in accordance with the invention.

With reference to FIG. 1, a portable, hand-held scanning device 10 is shown as having followed a meandering path 12 along an original 14. The original may be a piece of paper, an overhead transparency film, or any other image-bearing surface. The inherent structure-related properties of the original may be used to provide position information during navigation along the meandering path. In this approach, the positions of inherent structural features are tracked and the position information is used to rectify image data, but other embodiments will be described. The scanning device is preferably self-contained and battery powered, but may include a connection to an external source of power or to data ports of computers or networks.

The scanning device 10 of FIG. 1 includes an image display 16 to allow viewing of a captured image. However, a display is not essential to the use of the scanning device.

Figure 2:
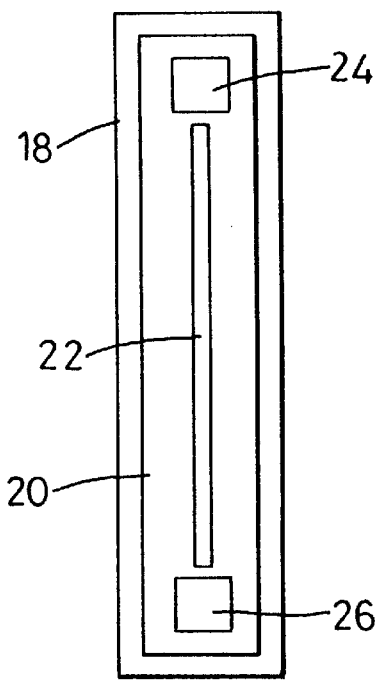
FIG. 2 is a rearward view of imaging and navigation sensors of the scanning device of FIG. 1.
Figure 3:
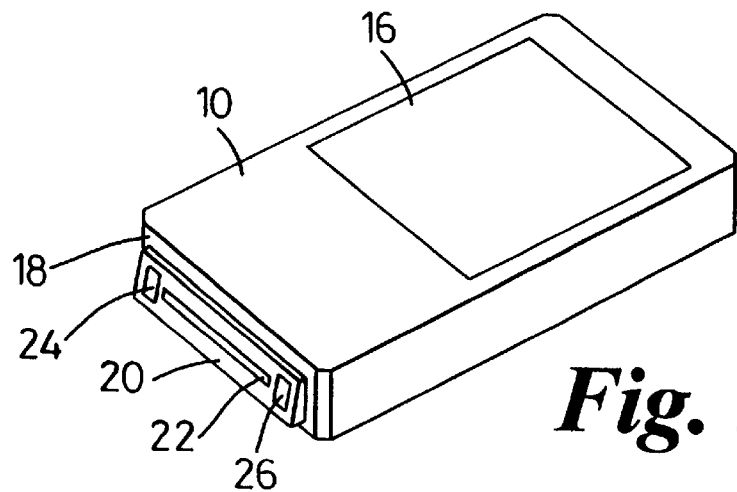
FIG. 3 is a perspective view of the scanning device of FIG. 1, shown with the imaging and navigation sensors exposed.

Referring now to FIGS. 1–3, the forward side 18 of the scanning device 10 includes a pivoting member 20 that aids in maintaining proper contact between the original 14 and an imaging sensor 22. The imaging sensor 22 comprises a linear array of image sensor elements. Navigation sensors 24 and 26 are located at the opposed ends of the imaging sensor. The navigation sensors 24,26 are mounted on the pivoting member and so the navigation sensors are in a fixed location relative to the imaging sensor.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment the imaging sensor 22 relative to an edge of the original 14. That is, the imaging sensor 22 may have an angle of attack that is not perpendicular to the direction of device translation.

For reasons of physical compactness, the imaging sensor 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a trade mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor 22 is shown as a linear array of discrete optically sensitive elements. The spacing of the elements plays a role in determining the spatial resolution of the scanner 10. For example, a linear array having a length of 101.6 mm requires 1200 sensor elements to achieve a resolution of 300 dpi. The sensor may be a charged coupled device, an amorphous silicon photodiode array, or any other type of linear array sensor known in the art.

A key consideration in the design of the imaging sensor unit is speed. The imaging sensor 22 preferably is able to image each pixel at approximately 5K samples per second. Linear imaging arrays generally produce a serial data stream, wherein pixel values, i.e. charges, are placed into a shift register and then shifted out. Achieving the desired speed requires either very fast serial transfer rates out of the entire image array or multiple taps, so that pixel values can be shifted through fewer cells. This introduces parallelism, which is advantageous for digital processing.

Another consequence of the speed requirement is that the products of pixel areas, at the surface of the original, and their solid angles of emitted light collected and conveyed to each array element should be sufficiently large to produce a detectable signal in integration times on the order of 200 microseconds. An enhancement option is to add an optical element to the sensor to increase the effective fraction of sensor pitch for which each sensing element is responsive. Since there is typically unused area in the array matrix, such light collection optics increase sensitivity.

A straightforward modification of the imaging sensor 22 enables sensing of color images. Three linear arrays parallel to one another, each with at least one embedded filter element that selectively passes red, green and blue components of the incident light respectively, would allow color imaging. Alternatively, a single array having broad-band sensitivity may be sequentially illuminated by red, green and blue light sources.

Regarding illumination for improving the operation of the imaging sensor 22, a linear array of high intensity light emitting diodes at the amber wavelength may be used. However, the selection of the preferred illumination source and any optical elements is dependent upon the medium of the original. The wave-length of the light is selected to maximize the contrast image data acquired during the scan of a given area of the original 14, while disregarding unwanted signals. Illumination optics may consist of LED dome lenses or may include a light pipe consisting of a precision-molded optical element that channels the illumination onto the original with a minimal amount of light loss. Such a design can afford a relatively uniform illumination of a target area of the original at a wide range of angles, but blocks normal incident rays in order to avoid specular surface reflections.

In FIG. 1, the meandering path 12 is shown as having four and a fraction swaths, i.e. side-to-side passes across the original 14. A useful imaging sensor 22 for most opportunistic applications has a length within the range of 25.4 mm and 101.6 mm. If the sensor 22 has a length of 63.5 mm, an A4 paper can be scanned in four or five swaths. As will be explained more fully below, the swaths should include regions of overlap, so that a stitching process can be used to produce a faithful reproduction of the original image.

The scanning device 10 typically includes at least one navigation sensor 24 or 26. In preferred embodiments, the device includes a pair of navigation sensors, with the sensors being at opposite ends of the imaging sensor 22. While a one-dimensional array of optoelectronic elements may be used, in the preferred embodiment, each navigation sensor is a two-dimensional array of elements. The navigation sensors 24 and 26 are used to track movement of the scanning device 10 relative to the original 14.

In preferred embodiments, each navigation sensor 24 and 26 captures images related to inherent structure-related properties of the original in order to produce information related to the position of the scanning device 10. For most prior art scanning devices, inherent structural features are considered to be noise. For the scanning device 10 of FIGS. 1–3, such features are noise with regard to the imaging sensor 22, but may be used to provide a ba sis for the navigation sensors 24 and 26 to generate position information. Useful, high-contrast images of surface texture can be generated by detecting structural variations that are inherent to the medium or are formed on the medium, e.g., text. For example, images may be formed based upon the contrast between shadows in valleys and bright spots at the peaks of inherent structural features. Such features are typically microscopic in nature, often ranging between 10 $\mu$m and 40 $\mu$m in size on common printed media. As an alternative, speckle may be used, since specular reflection of a coherent beam produces a contrast pattern of bright and dark areas. A third source of contrast information is color. Color contrast is independent of surface texture. Even when illuminating the texture-free surface with light in the visible range, color contrast exists between regions of different colors, e.g., between different shades of gray.

However, it is contemplated to use the invention for applications in which navigation information is independent of inherent structure-related properties of the original. Non-imaging approaches can also be used to acquire and process X, Y and angular position information. Such alternatives are discussed in U.S. Pat. No. 557,813.

The navigation sensors 24 and 26 of FIG. 2 effectively observe moving windows on the image of the original 14 and produce an indication of the displacement in two planar dimensions between successive observations. As will be explained more fully below, pixel values from the navigation sensors are processed to determine proper mapping of image data from the imaging sensor 22. Values of a particular pixel and its nearest neighbors are used to produce an array of correlation values at each pixel location. The correlation values are based upon comparisons between a current image of the surface structure and a stored image representing a known position of inherent structural features, wherein the stored image serves as a position reference. However, operations other than the correlation process may be employed in manipulating the input image data to form the output image.

Figure 4:
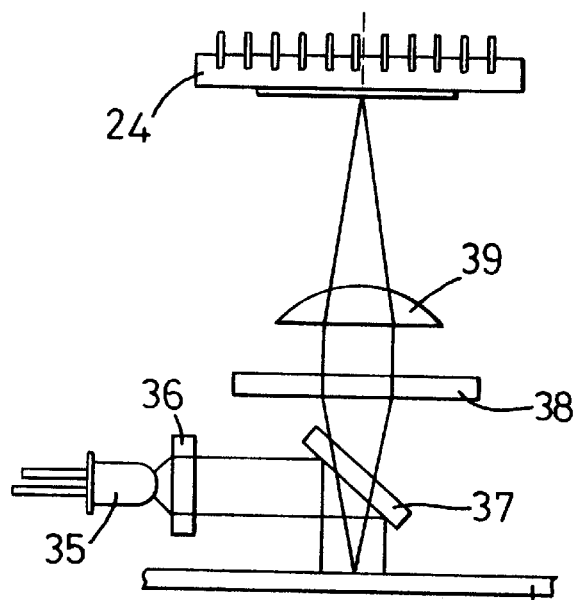
FIG. 4 is a schematic side view of an illumination system for one of the navigation sensors of FIG. 3.
Figure 5:
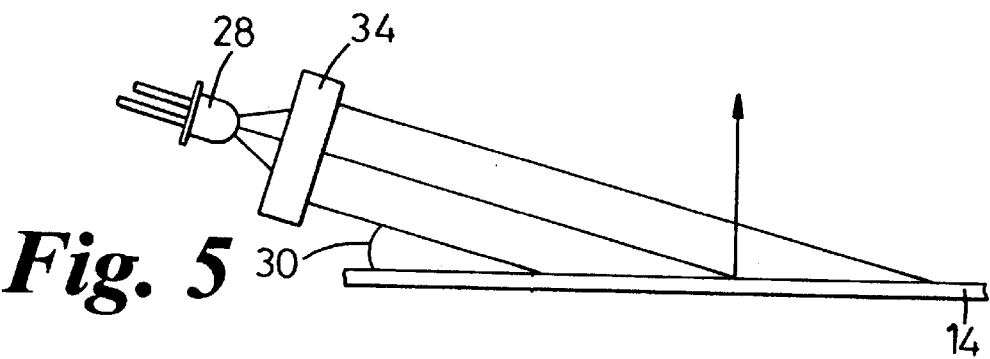
FIG. 5 is a side schematic view of a light emitting diode and optical elements for providing the illumination described with reference to FIG. 4.

Referring now to FIGS. 4 and 5, navigation sensor 24 is shown as being operatively associated with illumination optics. If the original 14 is a paper product for which paper fibers are to be detected by the navigation sensor 24, the introduction of light at a grazing angle of incidence is preferred. While not essential, one or more light emitting diodes (LEDs) 28 may be used. The grazing angle 30, which is the complement of the angle of incidence, is preferably in the range of zero degrees and fifteen degrees, but this may change depending upon the properties of the original 14. In FIG. 5, the source 28 is shown with illumination optics 34. The optics may comprise a single element or a combination of lenses, filters and/or holographic elements to accomplish suitable collimated and generally uniform illumination of the target surface. The wavelength of the light emitted by the source 28 should be selected to enhance the spatial frequency information available for navigation. Fixed pattern noise in the illumination field should be minimized. The output of source 28 may require adjustment to accommodate wide dynamic ranges of reflectivity of the medium as the scanning device proceeds over printed materials with absorbing or reflecting inks or other marking agents.

In FIG. 4, light from a source 35 is collimated at illumination optics 36 and then redirected by an amplitude splitting beam-splitter 37. That portion of the light energy from the LED directly to and transmitted through the beam-splitter is not shown in FIG. 4. The light energy from the beam-splitter illuminates the original 14 along the normal to the surface.

Also represented in FIG. 4 is the portion of the light energy that is reflected or scattered from the original 14 and passed through the beam-splitter 37 for aperturing and filtering at element 38 and focusing to an image at element 39. The portion of light energy passing from the original to the beam-splitter and reflecting from the beam-splitter is not shown. The magnification of navigation imaging optics should be constant over the field-of-view of the two-dimensional sensor array 24 which detects the focused light. In many applications, the modulation transfer functions, i.e. the amplitude measure of optical frequency response, of the navigation optics must be such as to provide attenuation before the Nyquist frequency that is determined by the pitch of the sensor elements of the navigation sensor and by the magnification of the optical elements. The optical elements should also be designed to prevent background illumination from creating noise. Note that a wavefront splitting beam-splitter could also be used.

The selection of the angle of incidence depends upon the material properties of the original. Grazing angles of illumination generate longer shadows and more apparent contrast, or AC signal if the surface of the original is not glossy. The DC signal level, however, increases as the illumination angle approaches the normal to the original.

Illuminating the target region of the original 14 at a grazing angle 30 works well for applications in which the surface of the original has a high degree of unevenness at the microscopic level. For example, the introduction of light from the source 28 at a grazing angle provides a high signal-to-noise ratio of data related to inherent structural features when the original is stationery, cardboard, fabric, or human skin. On the other hand, the use of incoherent light at a normal angle of incidence may be preferred in applications in which position data is needed to track scanner movement along such originals as photographs, glossy magazine pages, and overhead transparency films. With normal illumination, using incoherent light, viewing the original in the specularly reflected field will provide an image that is sufficiently rich in texture content to allow image and correlation-based navigation. The surface of the original has a microscopic relief such that the surface reflects light as if the surface were a mosaic of facets. Many of the facets of an original reflect light in directions slightly perturbed from the normal. A field of view that includes the scattered light and the specularly reflected light can thus be modeled as though the surface were composed of many such facets, each tilted somewhat differently with respect to the normal. This modeling is similar to that of W. W. Barkas in an article entitled "Analysis of Light Scattered from a Surface of Low Gloss into Its Specular and Diffuse Components," in Proc. Phys. Soc., Vol. 51, pages 274–292 (1939).

FIG. 4 shows illumination by a source 35 of incoherent light, which is directed along the normal of the surface of the original 14. FIG. 5 describes illumination at a grazing angle 30. In a third embodiment, no illumination is provided. Instead, the navigation information is accumulated using background light, i.e. light from the environment.

In a fourth embodiment, coherent illumination is introduced at normal incidence to permit speckle-based navigation. Relative motion between a scanning device and an original may be tracked by monitoring motion of speckle relative to the navigation sensors. If coherent illumination is used without using imaging optics, then by selecting a small area of illumination and by having a relatively large separation between the surface of the original and the photodetector array of the navigation sensor 24, the resulting predominant speckle cell sizes with coherent illumination are sufficiently large to satisfy the Nyquist sampling criterion. The use of a beam splitter allows the direction of both the incident illumination and the detected scatter to be near to normal to the surface of the original, as similarly accomplished in FIG. 4.

Figure 6:
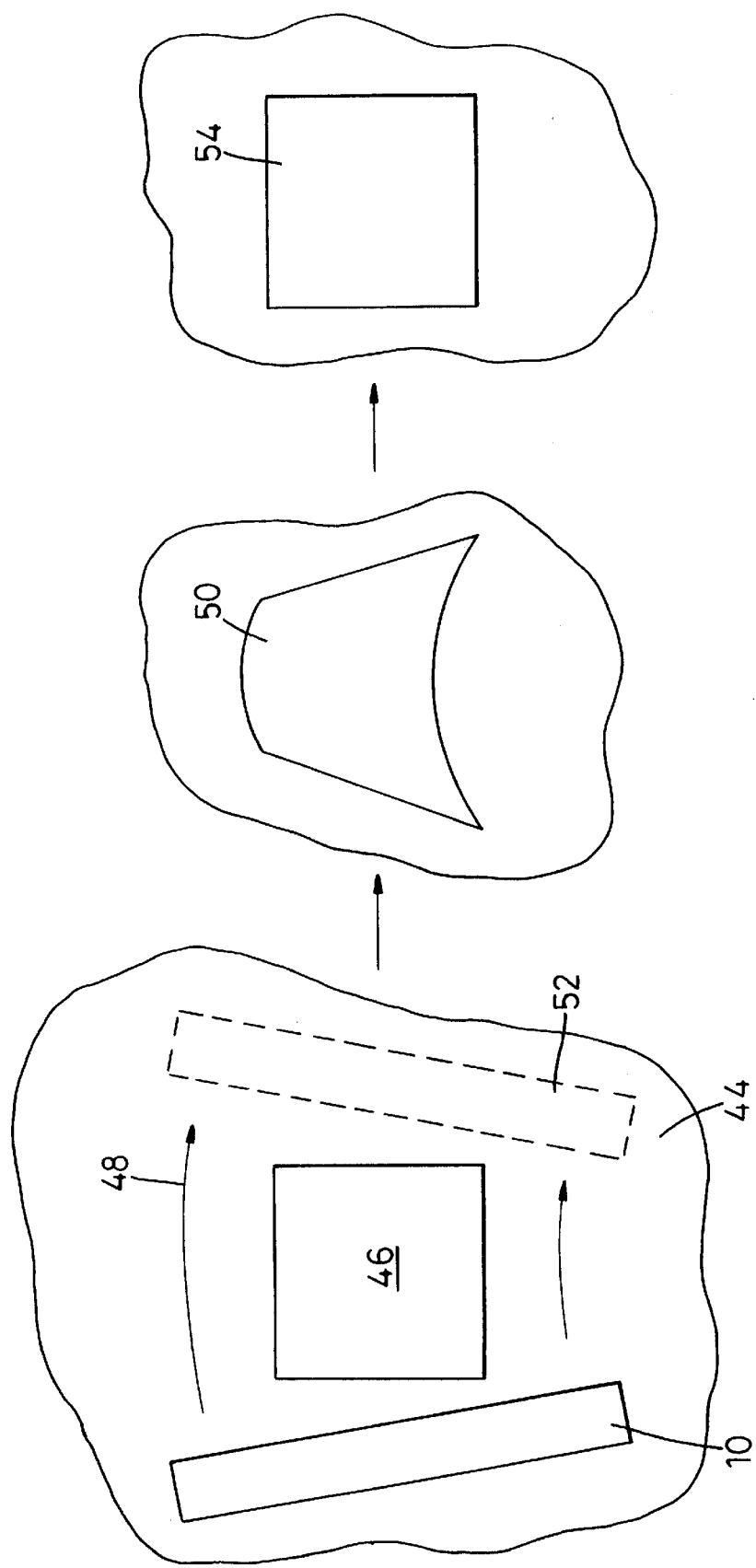
FIG. 6 is a conceptual view of the image capture operation of the scanning device of FIG. 1.

Referring now to FIG. 6, the scanner 10 is shown as being moved across an original 44 having a block 46 imprinted onto a surface of the original. Because the scanner 10 is not subjected to any kinematic constraints in the plane of the original, there is a tendency for a user to follow a curvilinear path across the original, as when the hand and forearm of the user rotate about the elbow. In FIG. 6, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the described embodiment, one or more navigation sensors capture data related to inherent structural features of the original 44. Movement of the inherent structural features relative to the scanning device 10 is tracked in order to determine displacement of the imaging sensor relative to the block 46. A faithful captured image 54 may then be formed. The image 54 is defined herein as the "rectified" image.

Figure 7:
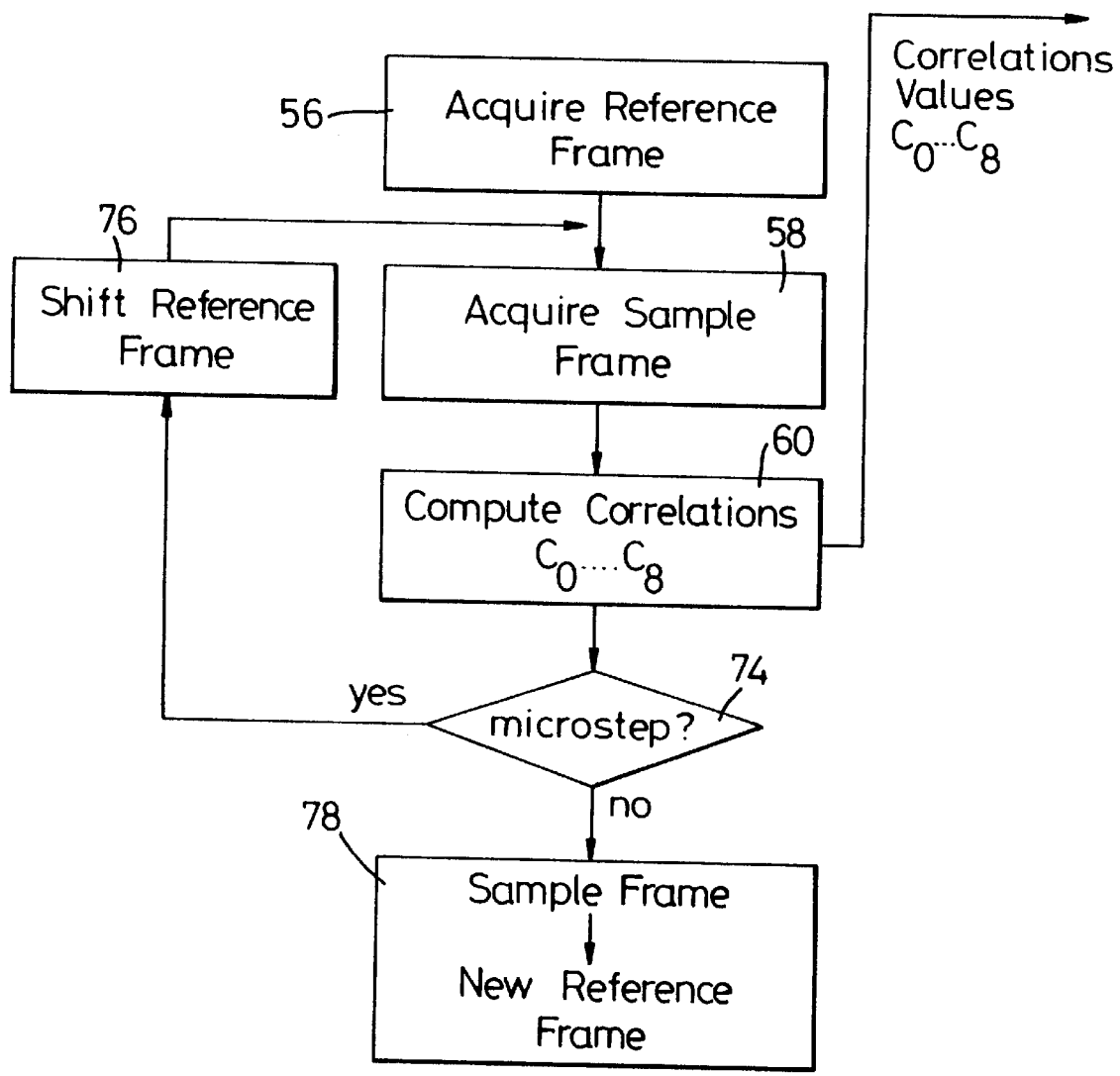
FIG. 7 is an operational view of one embodiment of the navigation processing of the scanning device of FIG. 1.

In FIG. 7, one embodiment of navigation processing is shown. The navigation processing is performed by correlating successive frames of navigation information, such as data related to inherent structural features. The correlations compare the positions of the inherent structural features in successive frames to provide information related to the position of a navigation sensor at a particular time. The navigation information is then used to rectify image data. The processing of FIG. 7 is typically performed for each navigation sensor.

In a first step 56, a reference frame is acquired. In effect, the reference frame is a start position. The position of a navigation sensor at a later time may be determined by acquiring 58 a sample frame of position data from the navigation sensor at the later time and then computing correlations 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

Although the navigation processing is performed computationally, the concepts of this embodiment may be described with reference to FIGS. 7 and 8. A reference frame 62 is shown as having an image of a T-shaped inherent structural feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels.

At a later time (dt) a navigation sensor acquires a sample frame 66 which is displaced with respect to frame 62, but which shows substantially the same inherent structural features. The duration dt is preferably set such that the relative displacement of the T-shaped feature 64 is less than one pixel of the navigation sensor at the velocity of translation of the scanning device. An acceptable time period is 50 $\mu$s for velocities of 0.4 5 meters/sec at 600 dpi. This relative displacement is referred to herein as a "microstep."

If the scanning device has moved during the time period between acquiring 56 the reference frame 62 and acquiring 58 the sample frame 66, the first and second images of the T-shaped feature will be ones in which the feature has shifted. While the preferred embodiment is one in which dt is less than the time that allows a full-pixel movement, the schematic representation of FIG. 8 is one in which the feature 64 is allowed to shift up and to the right by one pixel. The full-pixel shift is assumed here only to simplify the representation.

Figure 8:
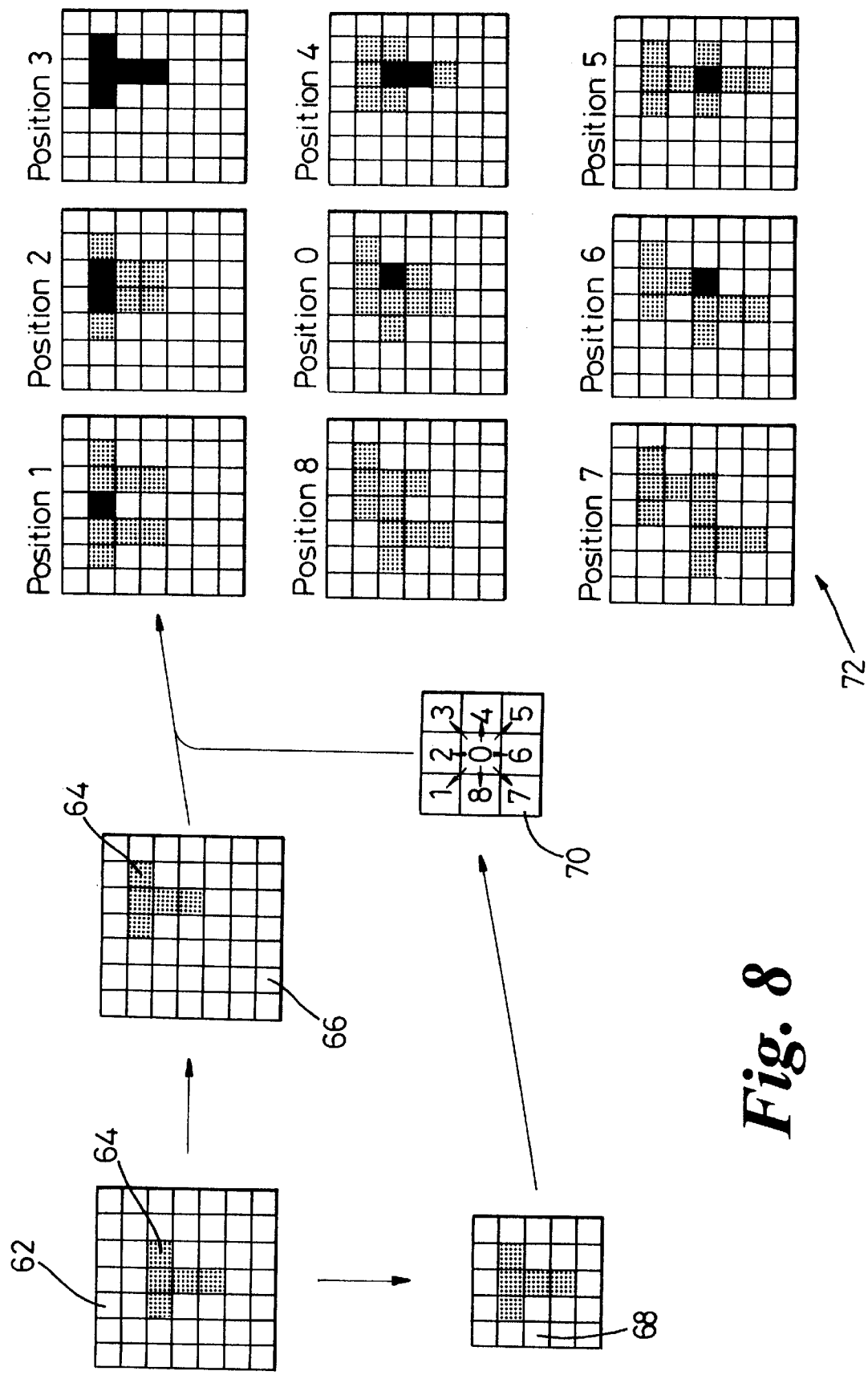
FIG. 8 is a schematic view of selected steps of FIG. 7.

Element 70 in FIG. 8 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 66 and 68. "Position 3" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in earlier-acquired reference frame 62, which implies that the scanning device has moved leftwardly and downwardly during time dt. While other correlation approaches may be employed, an acceptable approach is a "sum of the squared differences" correlation. For the embodiment of FIG. 8. there are nine correlation coefficients ($C_k=C_o$, $C_1$ . . . $C_8$) formed from the nine offsets at element 70, with the correlation coefficients being determined by equation:

$$C_k = \Sigma_i \Sigma_j (S_{ij} - R_{(ij)+k})^2$$

where $S_{ij}$ denotes the navigation sensor-measured value at the position ij of the sample frame 66 and $R_{ij}$ denotes the navigation sensor-measured value at the frame 68 as shifted at the element 70 in the k direction, with k being the identifier of the shift at element 70. In FIG. 8, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

As previously noted, the frame-to-frame correlations are referred to as "microsteps," since frame rates are chosen to be sufficiently high to ensure that the displacements do not exceed the dimension of a single pixel. Oversampling can provide sub-pixel displacement precision. Referring to FIG. 7, a determination 74 of whether a microstep is to be taken is made following each computation 64 of the correlations. If a microstep is required, the reference frame is shifted at 76. In this step, the sample frame 66 of FIG. 8 becomes the reference frame and a new sample frame is acquired. The correlation computation is then repeated.

While the process provides a high degree of correlation match, any errors that do occur will accumulate with each successive shift 76 of a sample frame 66 to the reference frame designation. In order to place a restriction on the growth rate of this "random walk" error, a sample frame is stored in a separate buffer memory. This separately stored sample frame becomes a new reference frame for a subsequent series of correlation computations. The latter correlation is referred to as a "macrostep."

By using macrosteps, a more precise determination of scanner displacement across a distance of m image frame displacements, i.e. m microsteps, can be obtained. The error in one macrostep is a result of a single correlation calculation, whereas the equivalent error of m microsteps is $m^{1/2}$ times the error in a single microstep. Although the average of errors in m microsteps approaches zero as m increases, the standard deviation in the average of errors grows as $m^{1/2}$. Thus, it is advantageous to reduce the standard deviation of accumulated error by using macrosteps having m as large as practical, as long as the two frames that define a macrostep are not so far spaced from one another that they have no significant region of common image content.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

Figure 9A:
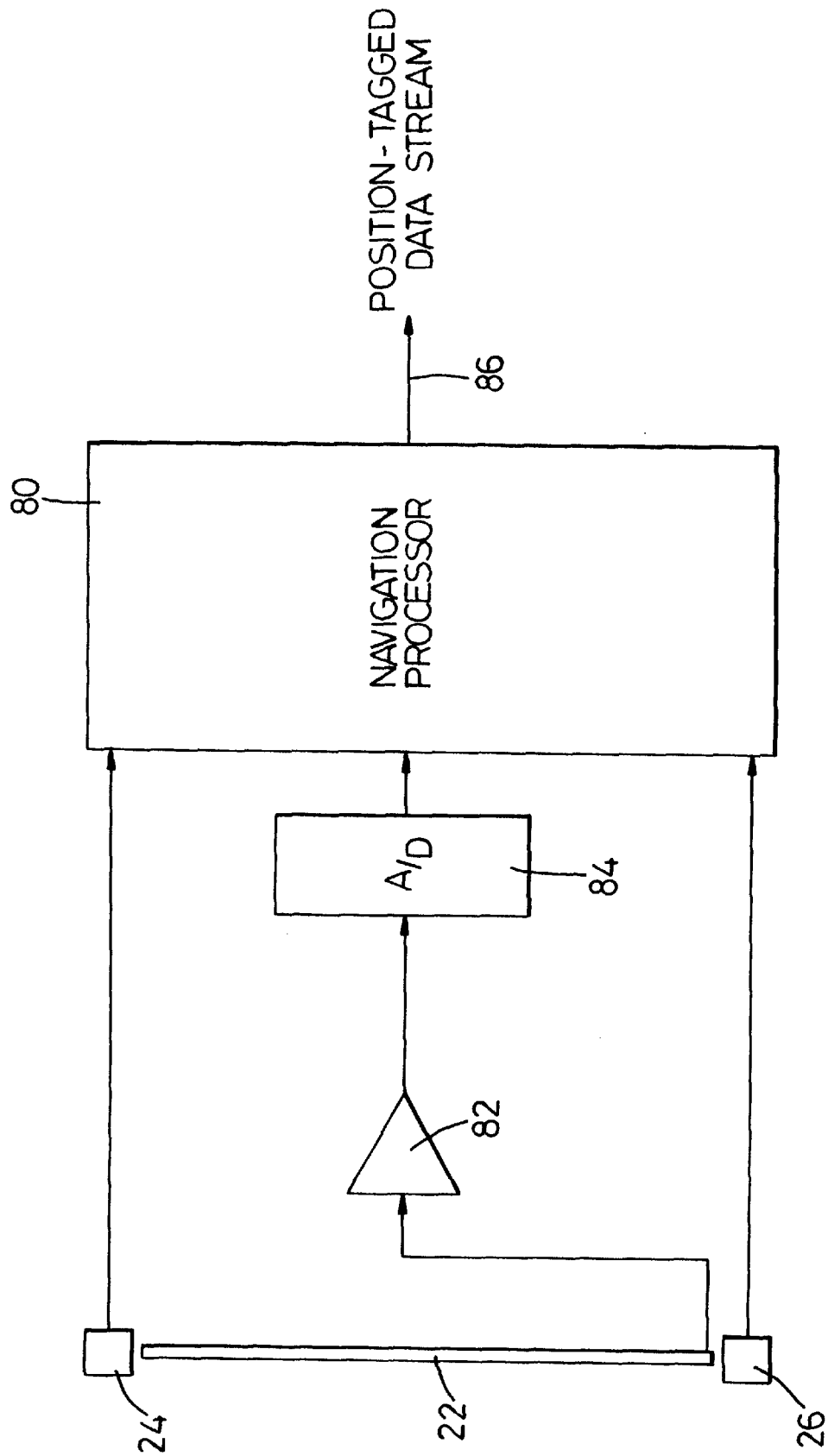
FIG. 9(a) is a block diagram of the components for carrying out the steps of FIG. 8.

Referring to FIG. 9a, the image signal generated at the imaging sensor 22 may then be "position tagged" based upon the navigation data. In one embodiment, pixel values from the navigation sensors 24 and 26 are received by a navigation processor 80 for performing the operations of FIGS. 7 and 8. Based upon the computed correlations, co-ordinates are determined for the current position of the first navigation sensor 24 and the second navigation sensor 26.

Within a macrostep the navigation processor 80 directly recovers the translational component of the motion of each navigation sensor. The data from both navigation sensors must be integrated to obtain an absolute position estimate that also takes into account any rotation of the scan head. Processor 80 maintains a model of the current orientation of the scan head with respect to its initial orientation. The individual estimates of the translation of each navigation sensor are interpreted with respect to this model. In turn the orientation of the scanner model is itself periodically updated.

In one embodiment the macrosteps of each navigation sensor are synchronised so that if the navigation sensor processor 80 requires a macro step in one navigation sensor, it also triggers a macrostep in the other. This simplifies the interpretation of the translations recorded by each navigation sensor. If at macrostep T the orientation of the scanner is θ degrees from vertical, then the recorded translation within the microstep of each navigation sensor is interpreted as follows.

Figure 9B:
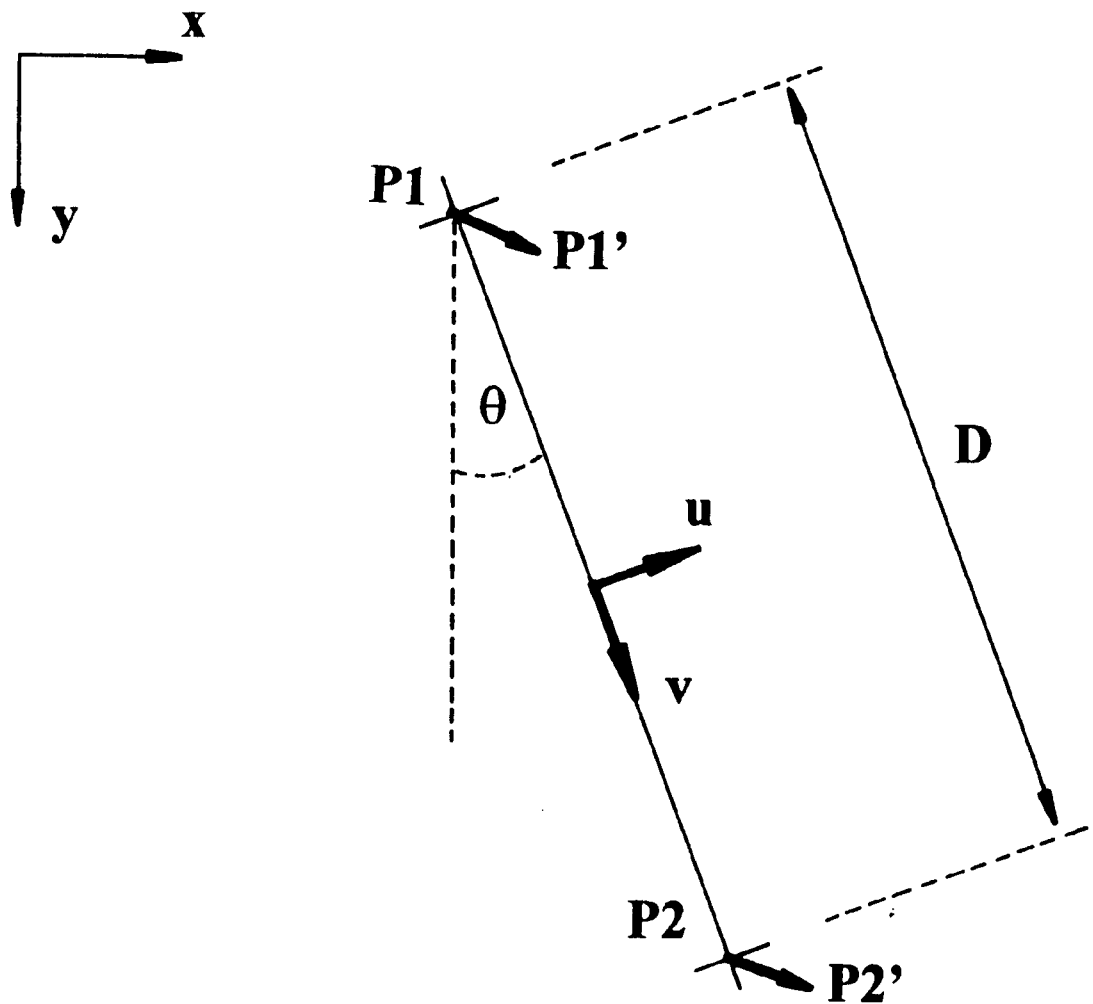
FIG. 9(b) shows the motion of the navigation sensors.

FIG. 9b shows the motion of the navigation sensors as a pair. For each we have recorded translations with respect to a co-ordinate frame (with unit vectors labelled u and v) that describes orientation of the scanner. These have magnitude (u1, v1) and (u2, v2) for the first and second navigation sensors respectively. The objective is to interpret these translations to give the updated locations of the navigation sensors with respect to the global co-ordinate frame. In essence we are reconstructing the path from a piece-wise linear approximation of it, where the magnitude of the linear sections is determined by the size of the macrostep.

Each unit vector is related to the orientation of the scanner θ according to the following standard trigonometric relationships $$v=(\sin\theta, \cos\theta)$$

$$u=(\cos\theta, -\sin\theta)$$

but as we shall see estimates of u and v can be maintained without computationally expensive trigonometric calculation.

In FIG. 9b, P1 and P2 represent the navigation sensor locations, with respect to the global frame, at the start of the macrostep; they have values (x1, y1) and (x2, y2) respectively. The updated locations, with respect to the same global frame, some navigation sensor frames later are given by P1' and P2', which have values (x1', y1') and (x2', y2') respectively.

In the limit (which we assume we are close to in order to perform accurate integration) the v component of translation of each navigation sensor must be the same (shear affects each end equally, and in the limit rotation induces no v component at all). Hence we can set v1 and v2 to their mean value $$v=(v1+v2)/2$$

In which case the updated endpoint locations are given by $$P1'=P1+u1u+vv \text{ and } P2'=P2+u2u+vv$$

It is also convenient at this point to translate the position estimates for correspondence to the physical endpoints of the image sensor rather than the individual navigation sensors. This is done using calibration data that relates the physical locations of the navigation and image sensors. For simplicity, the end point positions are made to correspond to the centres of the first and last sensor elements of the image sensor.

Periodically we must update the inertial frame. This should only be done at the end of one macro frame or at the start of the next. It requires that the macrosteps be synchronised: that is if one navigation sensor triggers a new macrostep, because it has exceeded the maximum number of microsteps, a macrostep should also be triggered in the other navigation sensor even if has remained stationary throughout. This approach has the additional virtue that the rotation of the navigation frame is always small as the maximum rotation experienced must be always be less than the maximum number of microsteps divided by the baseline between navigation sensors.

Updating the inertial frame has the effect of adding back the lost rotational component of the motion of the scanner. This is determined implicitly from the differential translations experienced by the individual navigation sensors. Rather than explicitly calculating the rotational component of the motion, the inertial co-ordinate frame is updated directly from its relationship to the principal axis of the scanner (the line joining the navigation sensor locations). The v axis of the inertial frame is a unit vector along the principal axis going from navigation sensor 1 to navigation sensor 2 and the u axis is the unit vector orthogonal to it that completes the 2D basis.

The updated value for v is given by $$v'=(v'_x, v'_y)=(P2'-P1')/|P2'-P1'|=(P2'-P1')/D$$

and the orthogonal vector u by $$u'=(v'_y, -v'_x)$$

The length |P2'-P1'| is the constant (modulo navigation errors) length of the scanner, labelled D in FIG. 9b. This greatly simplifies the calculation of the inertial frame as it avoids need for calculating the square root of the sum of squares for each macrostep.

The navigation processor 80 also receives N pixel values of the imaging sensor 22 via a pixel amplifier 82 and an analog-to-digital converter 84. Although FIG. 9 shows only a single tap from the image sensor 22 and a single A/D converter 84, multiple taps, each with an A/D converter, are within the scope of the invention. The current position coordinates are "tagged" at the ends of a line of data that corresponds to the number of pixels within the imaging sensor. The output 86 of the navigation processor 80 is therefore a position-tagged data stream.

The navigation processor 80 need not necessarily receive pixel data from the imaging sensor 22 and position information from the navigation sensors 24,26 at the same frame rate. The stream of position data may be used to update the estimate of the location of the endpoints of the linear sensor, which is generally at a higher spatial resolution than the pixel pitch of the linear sensor array. The optimum clocking frequency of the linear image sensor will generally be determined by the rate of motion of the scanner, in order that the fastest moving end is sampled at an amount just less than the pixel pitch of the linear sensor itself—otherwise either over-sampling or under-sampling will result. Over-sampling will result in increased computational and data processing requirements further along the image processing pipeline with little or no improvement in image quality, while under-sampling will result in a definite reduction in image quality.

One solution is to sample the linear sensor at a fixed frequency that would always result in over-sampling, that is it would exceed the sampling requirements of the fastest possible scanning speed. Then if the scanner is moving more slowly than the maximum scanning speed, unwanted samples are discarded by the navigation processor on the basis of the current endpoint position estimates. That is, the magnitude of the relative position of each endpoint since the last time a valid increment of linear sensor samples and tagged position data was output from the navigation processor 80 is used to gate the output of further increments. The simplest approach is to only allow output when one or other magnitude strictly equals or exceeds the pixel pitch (or a significant fraction of it). This approach is likely to result in under-sampling, particularly when scanning at just less than maximum scan speed. Alternatively, in order to prevent under-sampling, the current sample could be output if a prediction of the next linear sensor sample's relative end point positions exceeds the pixel pitch, where the prediction is based on the rate of change (or higher order numerical derivatives) of end-point position. A third approach which also prevents under-sampling is to introduce an increment buffer into the navigation processor, 80, so that the previous increment can be transmitted if the relative position data of the current increment exceeds the pixel pitch.

Each of the above sampling strategies are based upon synchronous sampling and will in general result in some degree of over or under sampling. A better overall solution that more closely achieves an ideal spatial sampling is for the navigation processor 80 to trigger the linear sensor capture asynchronously. One approach is for the relative end point position since the last valid capture (or a future prediction thereof) to be used directly to identify the best point in time to trigger the capture and sampling of the linear sensor.

In FIG. 10*a* an increment 88 of the data stream is shown as having position coordinate cells 90, 92, 94 and 96 at the opposite ends of N pixel cells, although this ordering is not essential.

The imaging sensor 22 is clocked as the scanning device moves across an original. As is discussed above, the clocking ensures that the fastest moving element of the sensor samples at least once per pixel displacement.

The position-tagged data stream at the output 86 of the navigation processor 80 is buffered as shown in FIG. 10*b*. A buffer B holds a multitude of the increments 88 of FIG. 10*a*. The buffer B may be used to accommodate an entire scan in which case data compression may be used. This data is then mapped to rectilinear co-ordinates to form a final rectified reconstructed image in accordance with a method according to the invention, as will now be described.

In the prior art methods taught in International Patent Application Publication No. WO 96/27257 and U.S. Pat. No. 5,578,813, the mapping to rectilinear co-ordinates is achieved by mapping to a rectilinear grid of predetermined size. Representing the rectilinear image as a single 2 dimensional array in this way has the twin disadvantages that it requires a large amount of working memory and restricts the scan path to fit within a pre-defined page. Accordingly, embodiments of the invention provide an improved method employing a dynamic tiling system. In such a system, the image space is represented as a number of discrete tiles which are allocated on a need to have basis at run time.

With such a tile based representation the actual path of data capture (a scan, in the case of the scanner embodiment described above) does not need to be limited ahead of time. Using a generic tile indexing scheme as described in detail below, it is possible with a hand scanner such as described above to scan any shaped region: the overall dimensions of the scan are limited only by the total area under the scan exceeding the available memory. Furthermore, in embodiments of the invention, when tiles become "inactive" and are no longer required to determine the processing of other tiles (i.e. they are no longer required for the purpose of rectification), these tiles can be compressed "on the fly" while data capture is continuing. This allows the total working memory required to store the rectilinear image during processing to be greatly reduced.

In a preferred method each active tile is represented as 2 dimensional array of bytes, where each byte represents a pixel. Other pixel representations, with either multiple pixels represented as a single byte or multiple bytes per pixel, could easily be accommodated. For convenience, tiles are chosen to be square with a dimension (height and width) that is a power of 2. 64×64 is a particularly appropriate choice: the embodiments discussed below employ this dimension. The rectilinear image location associated with the top left hand corner of each tile is from the geometry of the scheme a multiple of the tile size. Tiles do not overlap; they are contiguous with respect to the rectilinear image they represent.

Individual tiles exist in one of three states:
- empty implying that the tile does not currently exist
- active a currently active tile that is represented by a 2 dimensional array
- compressed a completed tile that has already been compressed Indexing of tiles is important for effective operation of such a method. In this regard, the approach taken by a preferred tiling scheme has two main components:
- an indexing scheme that maintains the list of tiles that represents the scanned image and provides a method to index individual tiles spatially; and
- a fast local index into currently active tiles that minimises the overhead of using the tile based representation for the frequent access into the image that occur during the rectification process.

Each rectilinear image co-ordinate is represented as two unsigned 16 bits values; one for x and one for y. For the case of 64×64 tiles, the top ten bits of x and y provide the tile index, which is used to identify the tile within which the rectilinear pixel is located. The bottom 6 bits of x and y give the within tile pixel location, and are used as indices for the 2 dimensional array that represents an active tile. If the tile identified by the top ten bits is empty, or has already been compressed, then it is not possible to use the bottom 6 bits directly to index the pixel in question. In these two cases memory must be allocated for the tile or the tile must be decompressed, respectively. An alternative to decompression is the allocation of an additional tile which must later be merged with the earlier-formed tile. Decompression and merging are computationally expensive operations and for efficient operation should be employed as little as possible.

10 bits allows indexing of a tile space that has 1024 tiles on a side. Each 64×64 tile is roughly $\frac{1}{5}^{th}$ of an inch on each side at 300 dpi which produces an addressable space over 200 inches wide and tall. This virtual image size will satisfy the most demanding scanning task, for example, if the origin of a scan path is located close to the centre of the address space, it is possible to scan in any one direction up to 100 inches before running out of tile space. The problems of exhausting working memory or long term storage are thus more significant: these are discussed in more detail below.

A particularly convenient way to represent the tile index is as a 2 dimensional array. This form of tile index will require less memory than would a totally flat array to index equally sized flat images (ignoring the image storage itself). However, if all ten bits were used even this approach would require 2 MB of working memory just for the index (allowing 16 bits for each tile entry). For applications such as handheld scanning, use of such large amounts of memory is currently very disadvantageous. It is therefore desirable to find an alternative approach which consumes less working memory.

Figure 11:
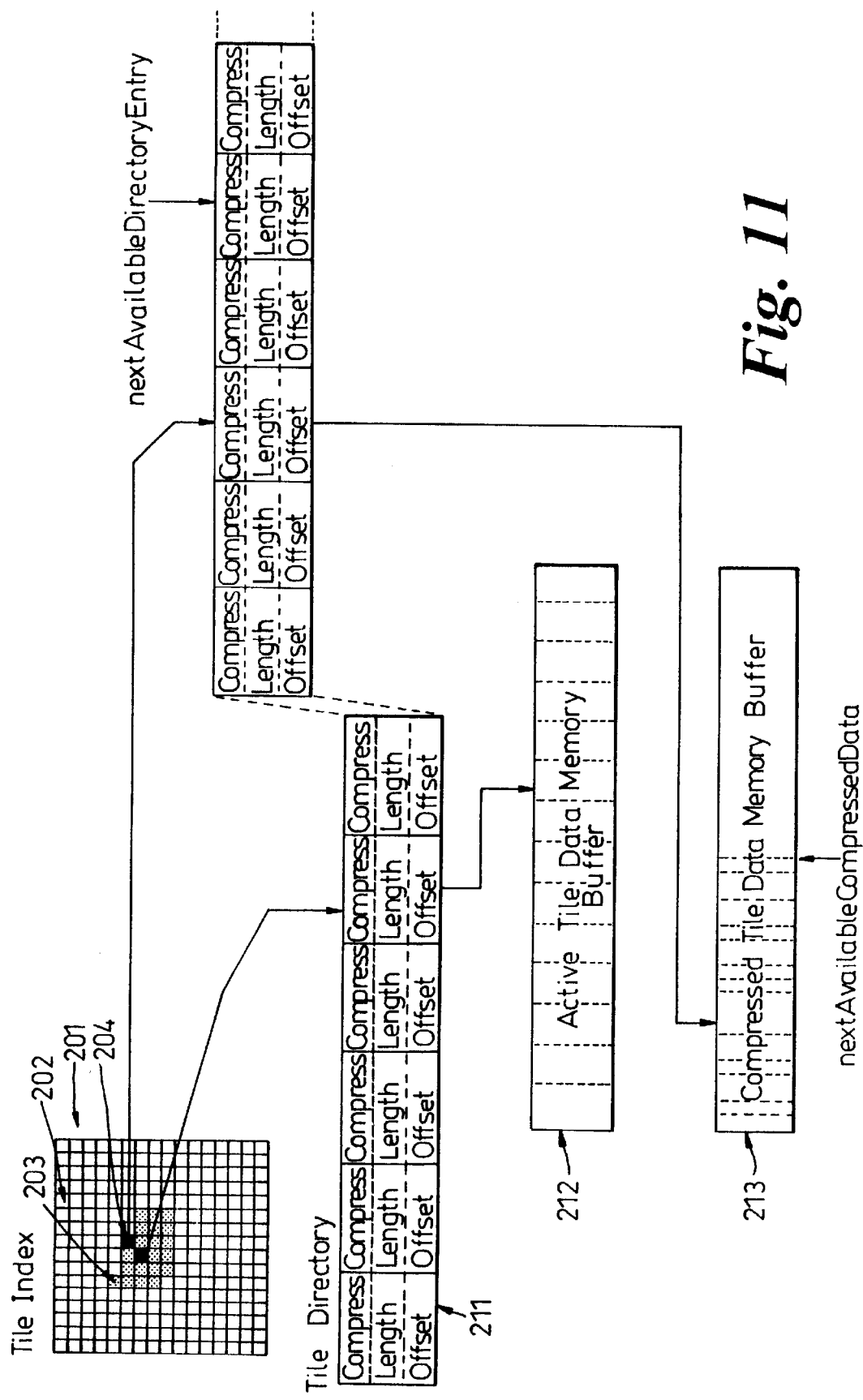
FIG. 11 is a representation of a tiling scheme according to an embodiment of the invention.

It has been found that employing a smaller array that uses only 8 bits to index the tiles is possible. This requires only 130 kB of working memory and allows scans with a width and height of up to approximately 25 inches. The following description indicates how an indexing scheme can be constructed in this way. FIG. 11 illustrates such an array 201 (but with only 4 index bits shown). Each 16 bit entry in the tile index array is either set to zero (which implies that it is empty, as for array entries 202) or contains an index (those array entries 203 shown hatched in FIG. 11) into a tile directory 211. Using 16 bits as an index into the tile directory 211 allows access to up to 64K tiles, which limits the total area of the scan to at most 2,560 square inches for hand scanner embodiments at 300 dpi. Given that a letter size page is of the order of 100 square inches (2500 tiles) this does not pose a problem, so it is even possible for a smaller tile directory to be used in practice.

Each Tile Directory entry contains a flag to indicate whether it has been compressed or not, a pointer to its start address and length parameter which gives the number of bytes used to store the compressed version. It is convenient to keep active and compressed data blocks in a separate chunks of memory. Eventually, upon completion of the scan, all blocks will be compressed so keeping the compressed data distinct from the working memory minimises extra processing required to coalesce the compressed memory and transfer it to long term storage. A pointer nextAvailableDirectoryEntry indicates which directory entries have been used. They are allocated sequentially as each new tile is encountered and are each used to represent a single tile per scan.

A particularly preferred approach is to represent the index as a partial quad tree. This is discussed for the case of use of ten bits of tile index. Each node in the quad tree can have only four children: none, some, or all of which may be set to nil. The node has pointers to these children. The four children (numbered 0, 1, 2 and 3) correspond to spatial locations: top left, top right, bottom left and bottom right respectively. Each level in the tree therefore represents a spatial resolution double that of the previous higher level in the tree. In this case, there are ten levels in the tree—one for each of the ten bits of tile index provided, separately, both in x and y dimensions. At each level, the appropriate bit from the y index indicates top or bottom (0/1 respectively) and the corresponding bit from the x index indicates left or right (0/1 respectively). In this way the 2 bit number formed by the y bit followed by the x bit gives the child node number at the current level in the tree. "Leaf nodes" of the tree (those at the lowest level, level ten) are either empty (set to zero) or point to a tile directory which is represented as described above with reference to FIG. 11.

Figure 12A:
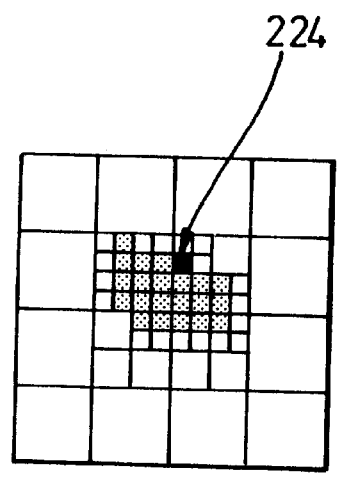
FIG. 12a is a spatial representation of a tile index in accordance with the scheme of FIG. 11.
Figure 12B:
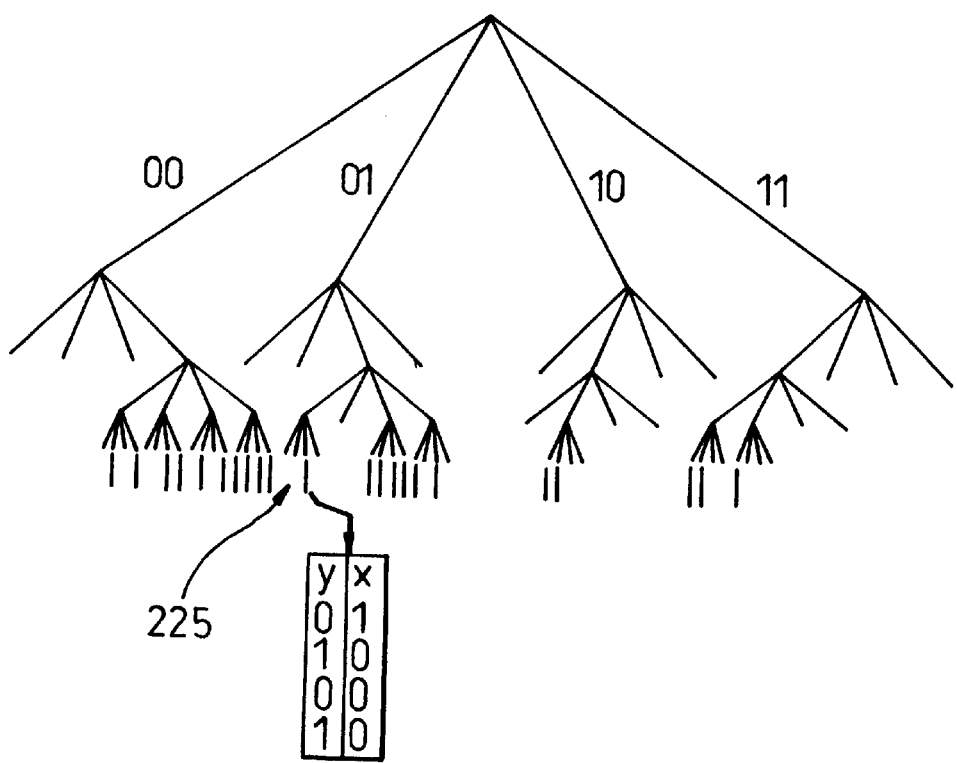

FIGS. 12a and 12b show a 4 bit tree that represents the active and compressed tiles shown in FIG. 11 for the simple 2 dimensional tile index described above. FIG. 12a is a spatial representation of the tile index which shows the different degree of spatial resolution that exist for different regions covered by the index. Only those regions which represent (or neighbour) scanned regions and have either active or compressed tiles are represented at the highest resolution in the index. FIG. 12(b) shows the index tree corresponding to the spatial index. Filled leaf nodes that point to tile directory entries are indicated by a vertical line beneath the corresponding leaf node in the tree. The tile entry 224 with 4 bit binary y index 0101 and 4 bit binary x index 1000 is shown as solid in FIG. 12a: the corresponding array cell is shown as cell 204 in FIG. 11. The associated leaf node 225 is indicated in FIG. 12b. As can be seen, the binary numbers formed from each successive pair of bits from the two indices (with the y bit in each case given first) give the node number at each level in the tree that lead to this leaf node. This is in the order 01 (node number 1), then 10 (node number 2), then 00(node number 0) and finally 10(node number 1) again.

Figure 13:
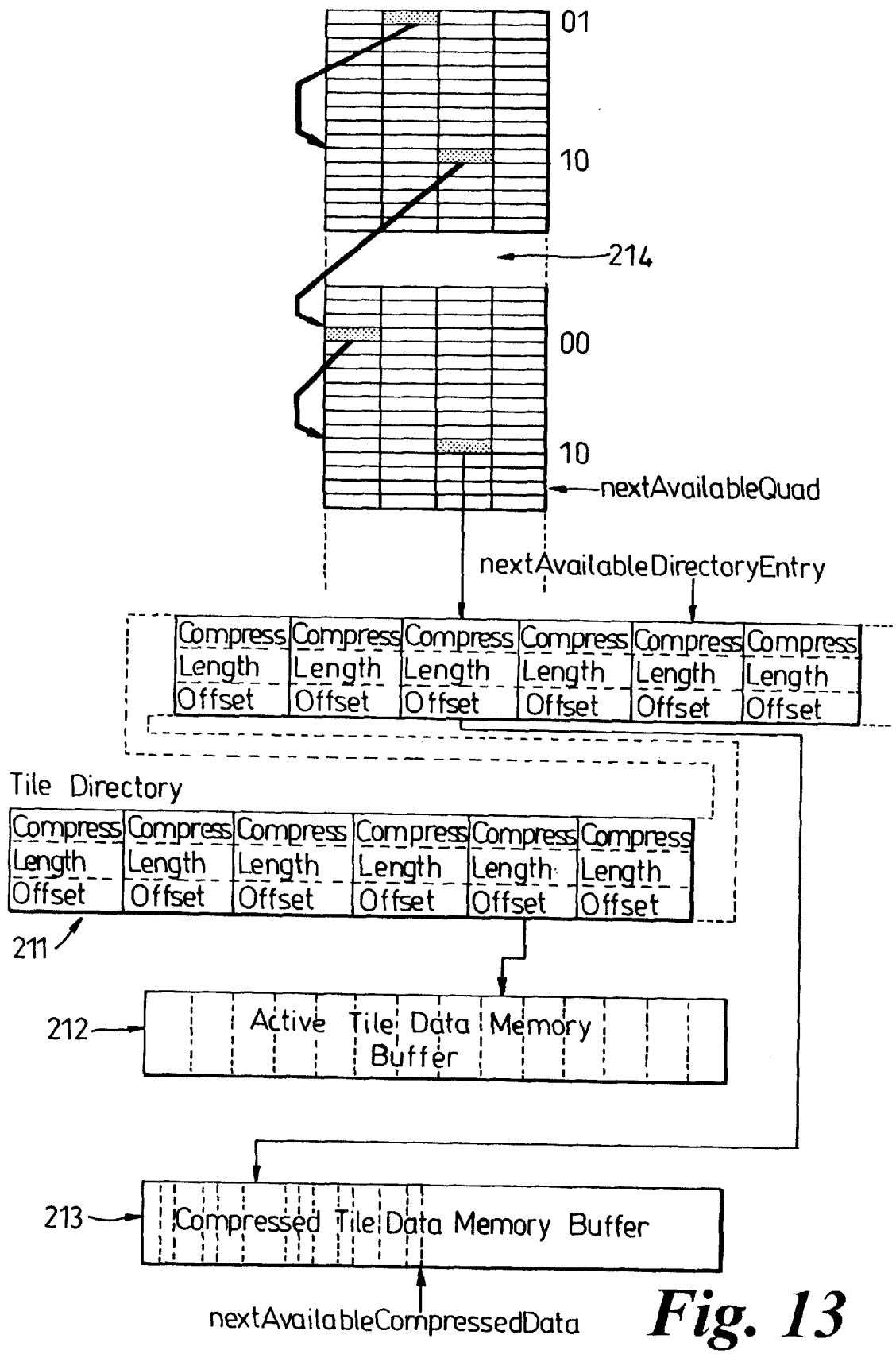
FIG. 13 shows an index tree as in FIG. 12b represented as an array of quads.

FIG. 13 shows a suitable representation of the tree as an array of quads 214: practical embodiments will have 16 bits (i.e. 10 index bits, for both x and y dimensions), though for convenience the 4 bit case is illustrated in FIG. 13. The first quad in the array is always the root node of the tree. The locations within the array of all the other nodes in the current tree are dependent upon the order in which the tree was constructed. The construction of the tree will be described below. Before this, where we described indexing of the tree, it was assumed that the tree had been properly constructed and that the tile we wished to address was already in the tree.

FIG. 12 shows the bits used to index the tree arranged vertically with the y co-ordinate index on the left. As discussed above, each pair of corresponding y and x co-ordinate bits forms a two bit address which corresponds to a child of a node in the tree. The first pair always represents a child of the root node (the first node in the quad array). The two bit address formed from the first pair of bits gives the number (0, 1, 2, 3) of the 16 bit element within the quad that represents the child of the root node. The value stored at this 16 bit location gives the quad array index of the quad that represents the children of that node: there are again clearly four such children. The second pair of bits identifies the child at that level. This process continues in the same manner to the tenth bit pair (in the more limited case shown in FIG. 13, the fourth bit pair) where the quad value now gives a tile directory entry number instead—this last node in the tree is a leaf node.

The quad tree structure provides a very efficient representation of the tile index. Each leaf node of the tree represents 4 tile directory entries. A tree of 700 quad nodes requires just 700*(4 children)*(2 bytes) to represent it; this is less than 6 KB for the whole tree. Most nodes in the tree are leaf nodes, as each set of four nodes has only one parent: there are ¼ the number of parent nodes as leaf nodes; ¹⁄₁₆ the number of grandparent nodes (in the sense of parents of parents to leaf nodes); and ¹⁄₆₄ great grandparent nodes; and so on. These "ancestor nodes" can be summed as a series: the series converges to a number of total ancestor nodes which is less than ⅜ of the number of leaf nodes. In this case of 700 total quad nodes, we thus have more than 500 leaf nodes representing 2000 tiles: in the case of a scanner operating at 300 dpi, this is more than enough to scan the area of a whole letter sized page. A particular advantage provided by this data structure is that this area can be scanned in any direction. Furthermore, where larger arrays are used to represent the quad tree, the area that can be scanned increases linearly.

The construction of the quad tree is now described. This is not complex: all that is needed is an additional pointer, nextAvailableQuad, that points just beyond the highest quad array entry currently used. Initially only the root node is allocated, all the pointers to its children are nil (represented by quad array index value 0) and nextAvailableQuad points at quad array entry 1. When building the tree we begin to work our way down the tree as if we were indexing it. If at any level the two bit value composed from corresponding pairs of y index and x index bits indicates a nil pointer, then the current value of nextAvailableQuad is substituted and nextAvailableQuad is incremented to the next quad array location. The four entries for the children of the newly created node must of course be set to nil. In this way the tree only grows during its construction, and no method to support deletion of nodes in the tree needs to be included.

Figure 14:
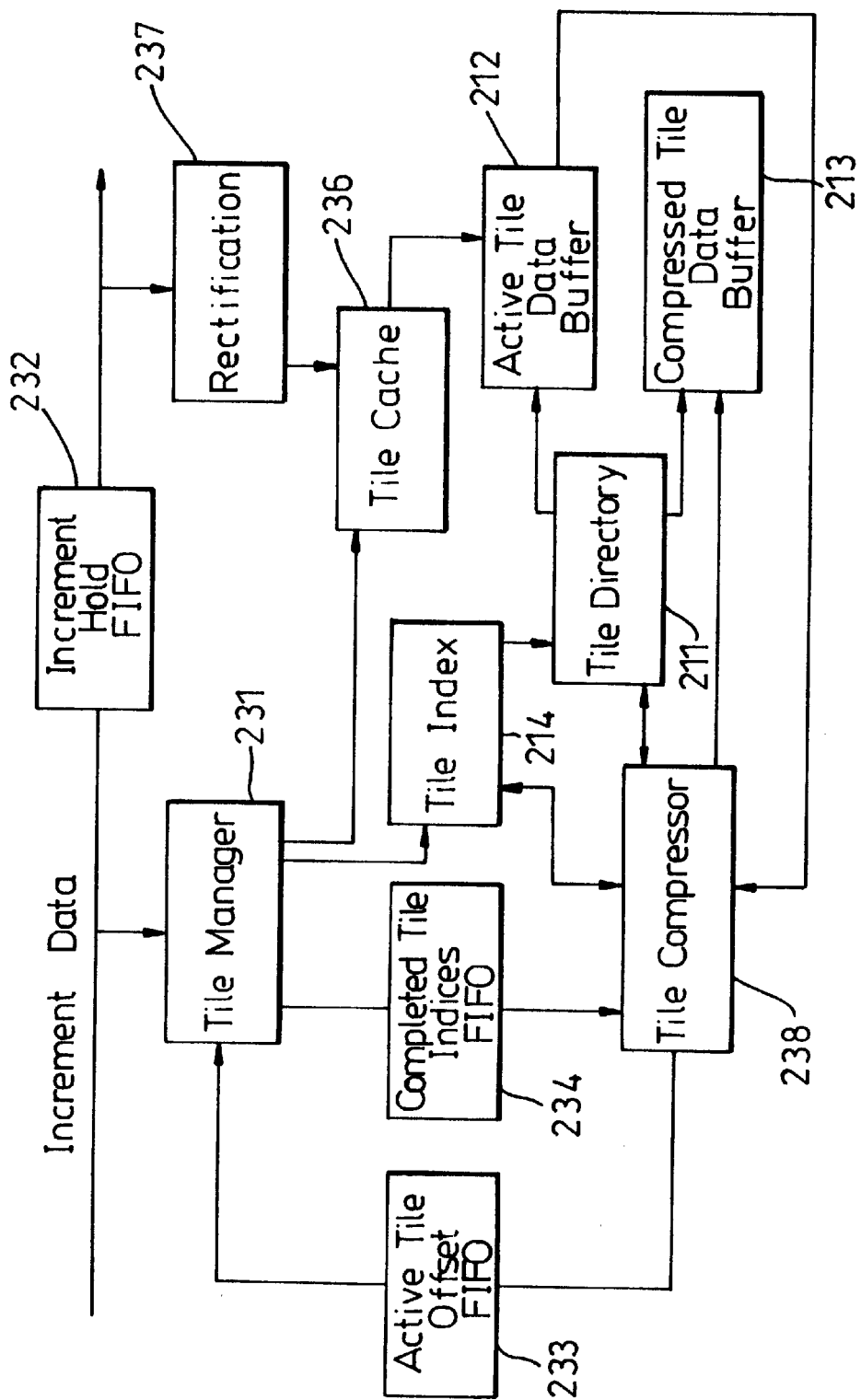
FIG. 14 shows a schematic representation of a method of tiling, rectifying and compressing scanned data in accordance with embodiments of the invention.

A method for tiling in the context of hand scanning is shown in the flow diagram of FIG. 14. This includes the process of rectification, which occurs together with tiling; however, details of rectification processes are not discussed here, but rather at a later point in this description. End point position information is read by the tile manager 231 from the stream of increment data 230 ahead of the point at which it is used for rectification. The appropriate delay between the tile manager 231 and the rectification unit 237 is introduced by an increment hold buffer 232. This is used to hold, a predetermined number of increments that have been examined by the tile manager but have not been rectified. As will become clear from the discussion that follows, an appropriate number of increments to hold is $(2^n+1)$, where n is an integer (typically 33 increments, in certain preferred embodiments). Once the increment hold buffer 232 is full, tile management is suspended until all the increments in the hold buffer 232 have been rectified. The last increment of one such chunk of increments becomes the first increment of the next chunk (hence the combined tiling and rectification process advances in 32 increment steps for a 33 increment hold buffer 232).

Figures 15A, 15B:
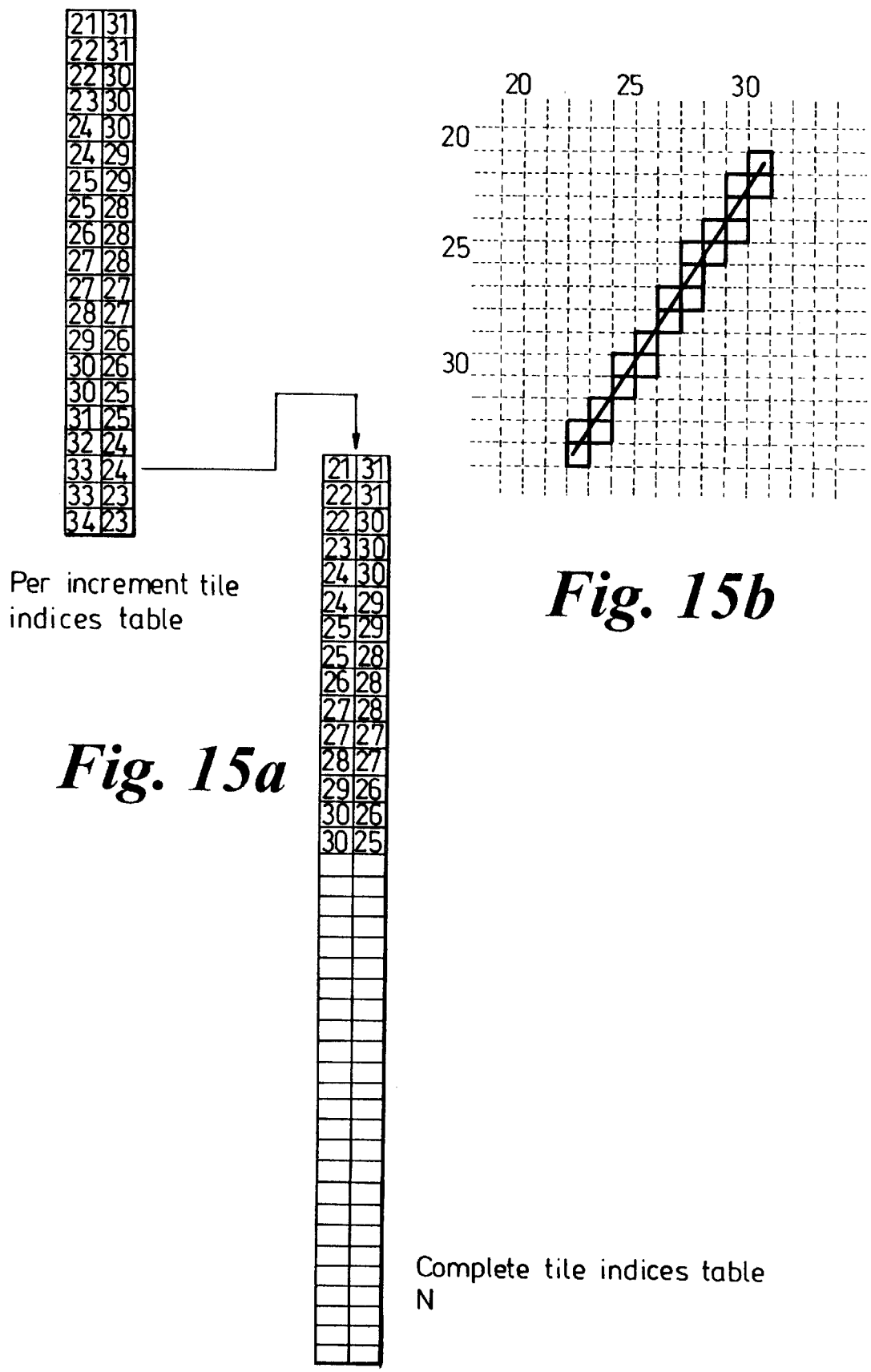
FIGS. 15a and 15b show the construction of a table of active tile indices that intersect a line in the context of the method illustrated in FIG. 14.

During each round of tile management the end point geometry associated with the increments in the increment hold buffer 232 (including the repeated increment from the previous round) is analysed to identify the set of currently active tiles. This can be done by considering the set of tiles through which a line drawn between the endpoints of each increment in the chunk passes. The superset of all such tiles (i.e. the combined group of all tiles intersected by an increment in the chunk) will be those that are active during the bout of rectification that will follow when the increment hold buffer 232 is complete. The set of tiles through which the line between the end point positions passes can be determined using a standard frame buffer line drawing technique: an example of such a technique is discussed in "Computer Graphics: Principles and Practice", James D. Foley, Andries van Dam, Steven K. Feiner and John F. Hughes, Second Edition, Addision-Wesley Publishing Company, Reading, Mass., 1990, pages 72 to 81. FIGS. 15a and 15b show part of the space of possible tiles and the subset of active tiles that intersect the line drawn between end point locations of one increment.

Before such a line can be drawn through the space of possible tiles, the end point position data must be scaled from rectilinear image pixel units to tile index units. In the case of 64×64 tiles as indicated to be appropriate for hand scanning, this involves division by 64. It is strongly desirable in practice to maintain all of the fractional precision that exists in the end point position data, in order to ensure that exactly the same set of tiles are made active as will be encountered during the forthcoming rectification process.

It is assumed here that the space between two increments is not large enough to allow a whole tile to lie between them. For the handscanning embodiment considered with use of 64×64 tiles this assumption will clearly hold, as the magnitude of the separation between increments is typically at most 2 output pixel units. It may in practice even be possible to sub-sample the set of increments (e.g. to consider for this purpose only every fourth one) used to identify active tiles with no loss of generality to achieve reduced computational overheads.

As each active tile is made explicit in this way, it is added to a tile index table N of active tile indices. As a tile is encountered during the line drawing process, then the indices of that tile are compared against those present in the table N of active tile indices. If a compatible entry is already present, the new tile indices are ignored; otherwise they are added to the end of the table, and the table size is incremented by one. Each tile index pair requires 10 bits for the y index and 10 bits for the x index. In preferred embodiments, for reasons discussed further below, a pair of 16 bit unsigned integers is used to represent the tile index pair, with the y index again first and followed by the x index.

The table N of currently active tile indices is used as the basis of a number of important tile management activities. These are:

a identification of previously active tiles that are no longer active and can now be compressed;

updating the tile index 214 to ensure that new active tiles are present and have memory allocated for them; and building a tile cache 236 to be used by the rectification unit 237 to give rapid access to the active tile data memory without need for reference to the tile index itself.

In a particularly preferred embodiment of the method a pool of tiles is allocated in the Active Tile Data Memory Buffer 212. This consists of the two-dimensional arrays of byte data that represent the part of the image represented by each tile. The active tile data memory is partitioned into contiguous areas, each large enough to represent an image tile. The minimum number of active tiles required is equal to the largest number of tiles that can be indicated as active at any one time. This in turn is determined from the largest number of tiles that can lie beneath the chunk of increments in the increment hold buffer 232. Assuming that the spacing between increments is less than 2 output pixels, as should be the case for the handscanner embodiment considered, then the overall spacing of the chunk could be at most 32*2: 64 output pixel units. When scanning at 45 degrees with respect to the rectilinear image the maximum horizontal extent will be 64*√2: 90 pixels. In a worst case, these span 3 tiles on each row. The maximum number of tiles along the scanner is given by the length of the scanner in output pixel units L, divided by the tile size and truncated +2 to allow for partial tiles (1 if L is an exact multiple of the tile size). This gives a conservative (as the scanner does not subtend its whole length at 45 degrees) maximum number of active tiles of maxActiveTiles=3*(L/64+2)

For a 2.5 inch scanner this gives maxActiveTiles2.5=3*(750/64+2)=39 tiles for a 5 inch scanner it gives maxActiveTiles5=3*(1500/64+2)=75 tiles and for an 11 inch scanner it gives maxActiveTiles11=90*(3300/64+2)=159 tiles assuming for each an output resolution of 300 dpi. Note that truncation in the division is assumed.

If one has, as in the embodiment discussed here, a byte provided for greyscale levels, a 64×64 tile requires 4 KB of memory, 2.5, 5 and 11 inch scanners at 300 dpi require a minimum of 156 KB, 300 KB and 636 KB of active tile data memory respectively (different levels of resolution, and consequently different memory requirements, are of course entirely possible within the scope of the invention). These figures assume that all the previously active tiles that are no longer active are copied, compressed and stored in the Compressed Tile Data Buffer 213 prior to the creation of new tiles. As a result, the memory resources from the Active Tile Data Buffer 212 that represented tiles which are no longer intersected by the current chunk of increments are returned to the pool of active tiles. This allows the reallocation of active tile data memory to new active tiles via the tile index and associated tile directory entries. This approach requires that the compression and rectification processes work in sequence, with compression taking place first and followed by rectification. In practice, a parallel implementation is preferred. In a preferred embodiment the number of active tiles (and hence the size of the active tile data buffer 212) is increased with respect to the minimum requirement to allow a dual processor implementation. One processor and supporting hardware units performs rectification while another performs compression. The increase in number of active tiles required is determined by the minimum degree of overlap that must be present between the successive chunks.

We now describe how the Tile Manager 231 updates the tile index 214 to ensure that new active tiles have memory allocated to them. At the start of s canning the Tile Index 214 and Tile Directory 211 entries will indicate an empty quad tree. At this point, the array of quads that represents the Tile Index 214 has a single root entry at array location 0, all four children node pointers for the root entry are nil, and nextAvailableQuad points to quad array element 1. An index nextAvailableDirectoryEntry points to the first entry in the Tile Directory 211. An Active Tile Data Offset FIFO 233 is initialised to include an entry for each block of tile data in the Active Tile Data Buffer 212. When scanning begins, each entry in the new table of active tile indices N is examined, and the tile index associated with its location is accessed through the quad tree Tile Index 214. If the quad tree Tile Index requires a new entry to represent this tile, such a new entry is created as discussed above with reference to FIG. 13. If an entry in the index table refers to a leaf node of the tree that is currently nil, this indicates that the scan path has entered a new tile. In this event, the leaf node in question is made to reference the next entry of the Tile Directory 211 at the location pointed to by nextAvailableDirectoryEntry: nextAvailableDirectoryEntry is then incremented. This new directory entry is marked to indicate that it has not been compressed, and it is made to point through its offset field to the Active Tile Data offset value extracted from the Active Tile Data Offset FIFO 233. The data associated with the tile image in the Active Tile Data Buffer 212 is then initialised to a background value. This background value is chosen to be the brightest 8 bit white intensity available for the greyscale used.

At this stage it can be determined which tiles were active in the last bout of scanning (in the case used in this description, last tranche of 33 increments) but are no longer active in the current bout. The indices of such tiles are in a preferred version of the method added to the Completed Tile Index FIFO 234. This approach requires extra storage within the Tile Manager 231 to retain the table of active tile indices for the previous chunk of 33 increments. At the start of the scan, this table will be empty. Each entry in the "stale" table of tile indices is compared against the newly acquired active table of indices for the current 33 increments of the Increment Hold Buffer 232. Any entries that are present in the old table which are not also present in the new table are added to the Completed Tile Index FIFO 234 to indicate that they should be compressed by the Tile Compressor 238.

The Tile Compressor 238 extracts tile indices from the Completed Tile Index FIFO 234 in turn and compresses these tiles. Compression can include any appropriate form of processing to reduce the amount of memory consumed by a tile, including the loss of any component in the data whose retention is not considered necessary to achieve a representation of the desired quality or form. Compression could thus include changes of representation and/or spatial or greyscale resolution. An appropriate approach which is well known in the art is binarisation as a result of the application of a thresholding scheme (such a scheme is discussed in "Digital Image Processing", William K. Pratt, John Wiley & Sons, Inc., New York, 1991, pages 597 to 600). Any one of a number of standard compression schemes for greyscale or binary data could be employed, such as group 4 fax compression for binary data or LZW for greyscale.

During the compression stage, the original tile from the Active Tile Data Buffer 212 remains unaffected. A new copy of the tile in compressed (or otherwise changed) form is made within a Compressed Tile Data Buffer 213 location indicated by a nextAvailableCompressedData pointer. This buffer is filled sequentially in the order that tiles are marked for compression. The Tile Directory 211 entry associated with the now-compressed tile (obtained from the Tile Index 235) is then updated to point at the appropriate location within the Compressed Tile Data Buffer 213 and both its length field and compression state are amended. The offset within the Active Tile Data Buffer 212 associated with the active version of the now-compressed tile is then returned to the back of the Active Tile Data Offset FIFO 233 to be used when required to represent a further active tile. Finally, the nextAvailableCompressedData pointer is incremented in accordance with the length in bytes of the compressed tile. In general, each tile will compress to a different number of bytes, depending upon the content of the tile and the compression scheme employed.

Figure 16:
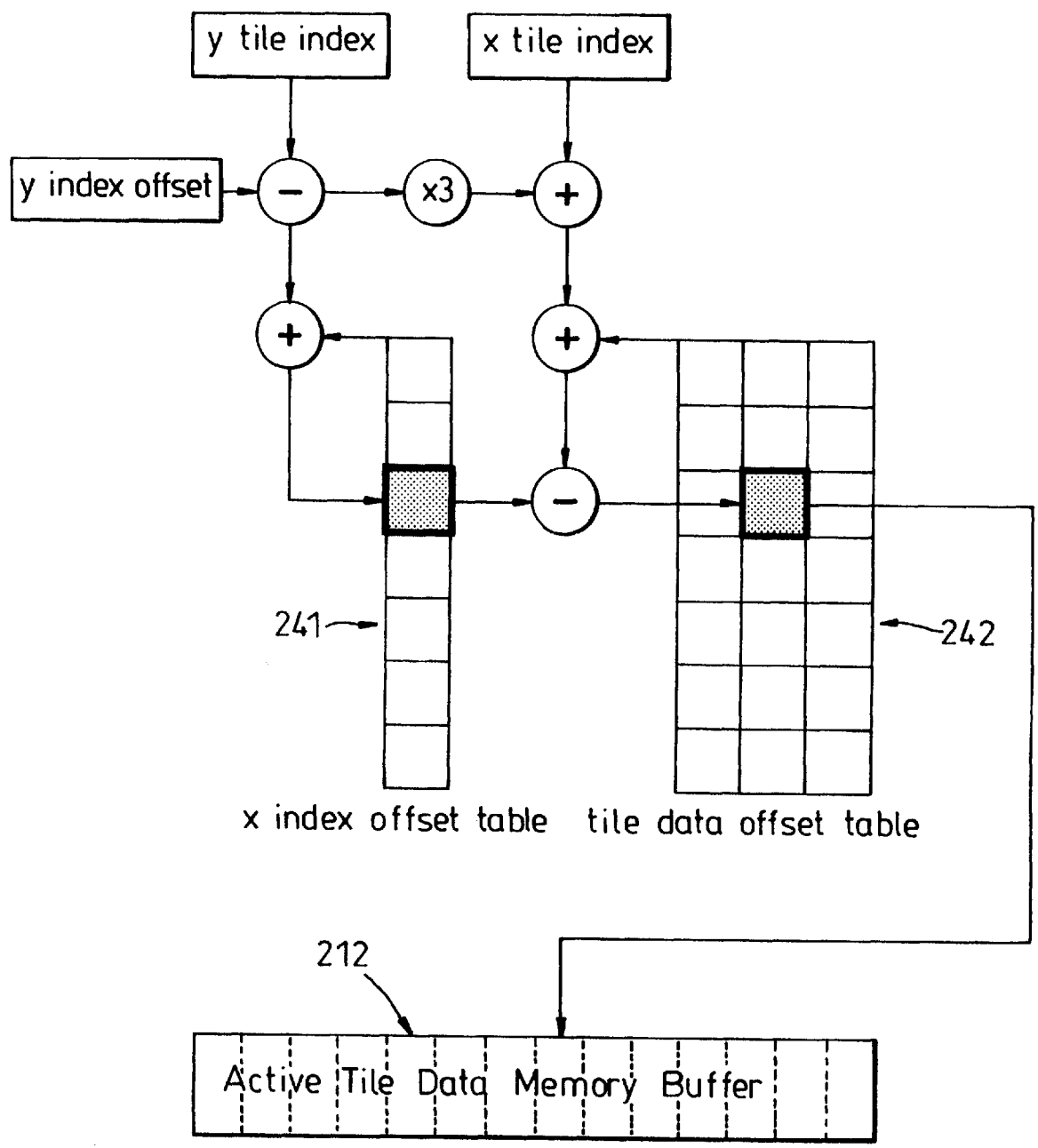
FIG. 16 shows the construction of a tile cache in accordance with the method illustrated in FIG. 14.

As described above, a Tile Cache 236 is provided for computational efficiency in the rectification process. FIG. 16 shows the Tile Cache built by the Tile Manager 231. To address a specific pixel at location (x, y), where y and x are each 16 bit row and column positions, each co-ordinate must first be broken into its tile index component, and its "within tile" position component. These are provided by the top 10 bits and the bottom 6 bits of each co-ordinate respectively. The way the y and x 10 bit tile indices are used to access the tile array data within the Active Tile Data Memory Buffer 212 using the Tile Cache is shown in FIG. 16. The y index offset, corresponding to the minimum y index amongst the currently active tiles, is subtracted from the y index of the co-ordinate under consideration to give a local y index that is used to access both an x index offset table 241 and a tile data offset table 242. The x index offset table 241 is a linear table of x tile offsets which contains the minimum x index for each row (and hence y tile index value) of the tile index after the y offset row, up to a maximum row determined by the length of the scanner (this "max row" will be y index offset +(L/64)+2, where once again the added factor of 2 results from the division and the consequent effect of partially filled tiles and truncation). The tile data offset table 242 is an array of triples, each element of which contains a 16 bit index to the Active Tile Memory Buffer 212. The entry in the x index offset table 241 is given in the case shown by adding the local y index to a table base address (assuming that arithmetic is performed in x index offset table cell units: in this implementation, this will be 16 bit). Similarly, the relevant triple in the tile data offset table 242 is given by adding three times the local y index to the tile data offset table's base address. The index into the tile data offset table 242 is further altered so as to address the relevant tile index by adding the local x offset for the relevant row: this is given by the difference between the original x tile index and the entry for that row from the x index offset table 241.

The content of the relevant cell in the tile data offset table 242 provides a pointer to the base address of the array of image data that represents the tile within the Active Tile Data Memory Buffer 212. The low 6 bits from each co-ordinate are then used to form an address within the tile in the usual way. Not all cells in the tile data offset table 242 will be valid: those that are not have a nil pointer. The table is constructed to be large enough for the worst case scenario (in terms of tiles required by a chunk of, here, 33 increments) and frequently fewer tiles than can be indexed by the tile data offset table 242 will be currently active.

Rectification processes suitable for use with the combined tiling and rectifying scheme discussed above with reference to FIG. 14 are discussed below. It would be possible to adopt a Bresenham algorithm approach to achieve rectification, as is discussed in International Patent Application Publication No. WO 96/27257 and U.S. Pat. No. 5,578,813. However, more sophisticated approaches such as those discussed in European Patent Application No. 97302519.0, the content of which is incorporated within this application to the extent permitted by national law, are preferred.

Figure 17:
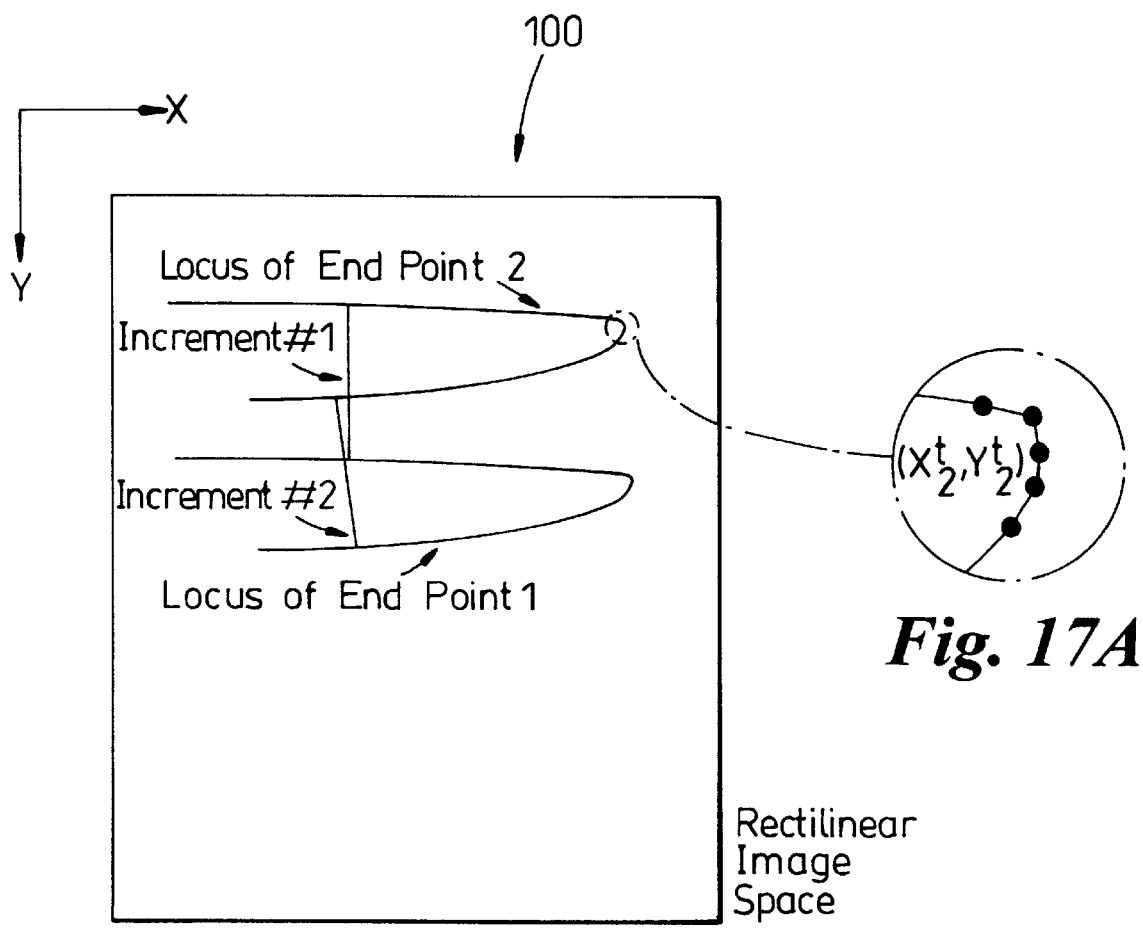

FIGS. 17 and 17A show a coordinate frame provided by the array of tiles to which the stream of increments 88 are mapped to form the final rectilinear image. There is no rectilinear image buffer of predetermined dimension, as in the methods of International Patent Application Publication No. WO 96/27257 and U.S. Pat. No. 5,578,813, but rather a tiled rectilinear image space of undetermined overall dimension but predetermined scale. The X and Y co-ordinates of the position tags associated with each increment correspond to horizontal and vertical dimensions (column and row indices) in the rectilinear image space. Also shown are the loci of positions tags (shown enlarged in the scrap view for a short section, on the right) for each end point of the linear image sensor associated with a stream of increments. Within these a pair of increments (Increment #1 and Increment #2) are highlighted by joining their position tags with straight lines. These are chosen as almost intersecting in the overlap region where the scan doubles back on itself.

It is possible that the resolution of the rectilinear image buffer, which is determined by the output resolution required from the scanner (typically either 200 or 300 dpi) differs to that in which the endpoint position data is measured. That is in turn determined by the resolution of the navigation sensors 24 (which is dependent upon the spatial extent of the features, e.g. paper fibres, imaged during navigation). To accommodate such differences it is necessary for the endpoint position data to be scaled to the output pixel resolution.

The next operation is to map the position-tagged image increments within a swath into the tiled rectilinear image space. It is particularly important that sufficient image quality is maintained in this process. One approach is simply to map the elements within each increment to the pixels of the rectilinear image array through which the straight line drawn between the endpoint locations passes. The mapping could either be to the closest linear sensor element for each image pixel, or involve interpolation between sensor elements. Appropriate linear or cubic interpolation methods for application in this context are described in Wolberg, "Digital Image Warping", pp 127–131, IEEE Computer Society Press, Los Alamitos, Calif., 1992.

Figure 18:
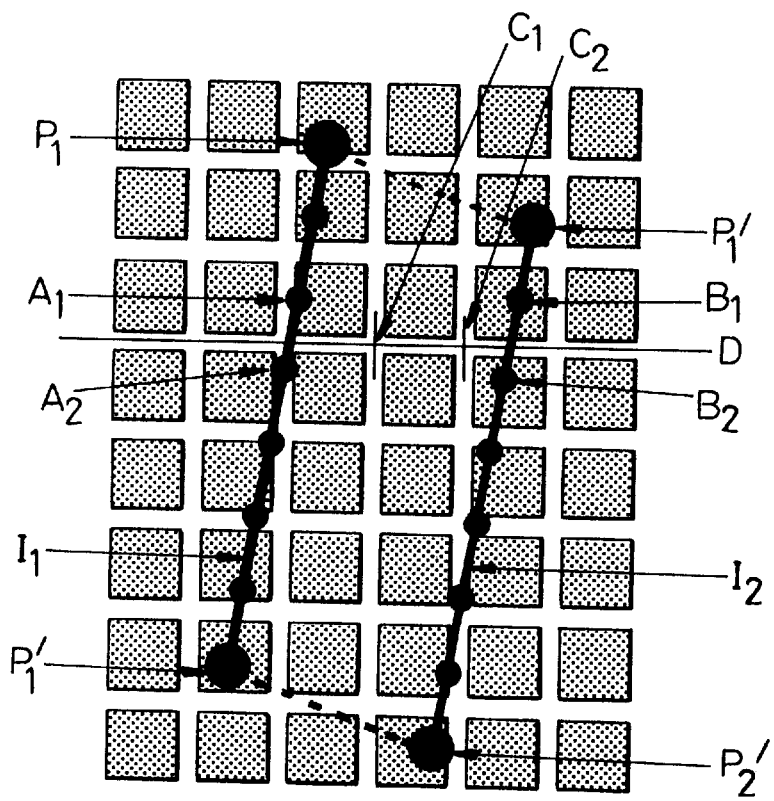
FIG. 18 shows a portion of the rectilinear image space of FIG. 17 defining the scanned image with two linear image sensor positions mapped thereon.

Performing rectification in this way will inevitably introduce sampling artefacts because each increment has a distinct impact. Moreover, it will be necessary in practice that the original swath of position tagged image data is strictly over-sampled with respect to the rectilinear pixel grid (which may, for convenience, be at a higher spatial resolution than the pixel pitch of the linear sensor itself) otherwise pixel drop out will occur in the rectilinear image. A solution is illustrated in FIG. 18. In this figure, the end point positions of a pair of increments I1 and I2 define a region. These increments can be a successive pair of linear sensor readings—the use of consecutive readings is termed here the PAIRWISE approach. Alternatively the increments I1 and I2 can be the bounding pair of a larger group of sensor increments—the use of such increments is here termed the CHUNKWISE approach. It will be shown that there is computational advantage to be gained in the CHUNKWISE approach from treating a group of increments in unison at the cost of some small reduction in image quality when compared with the PAIRWISE approach.

Pixel locations in the tiled rectilinear image space are associated with integer locations. For each such pixel within the region defined by a pair of increments, an intensity value is then computed by integrating a number of linear sensor pixels that map to a region around it. In particular preferred embodiments, various forms of bilinear interpolation are used to integrate a specific four linear sensor pixels taken from the pair of successive increments that span the pixels location: two sensor pixels from the increment that maps to a line that lies to one side of the rectilinear array pixel, and a further two sensor pixels from the adjacent increment that maps to a line on the opposing side of the rectilinear array pixel.

In FIG. 18 a pair of increments I1 and I2 are shown mapped into a portion of the rectilinear space that defines the scanned image. For simplicity end point positions P1, P2 and P1', P2' are made to correspond to the centre of the first and last sensor elements of increments I1 and I2 respectively. Intermediate sensor elements such as A1, A2 and B1, B2 are also shown. Pixels locations in the rectilinear image array are chosen to correspond to integer locations with respect to the end point position geometry. The resolution of the output rectilinear image may not be the same as that of the linear image sensor. However, irrespective of the actual resolution, N sensor pixels map along the line that joins the endpoints of each increment. For ease of explanation, in FIG. 18 N=8, that is each linear sensor has just 8 elements in it and the length of each increment is N−1=7 times the pixel pitch of the linear sensor as measured in output rectilinear pixel resolution units.

Specific pixels that lie within the region defined by a bounding pair of increments can be identified from the interval given by the x components of the intersects of each rectilinear image row with the two increments. An example is provided by pixels C1 and C2 on rectilinear image row D in FIG. 18. From simple geometry, if increment I1 has endpoint co-ordinates (x1, y1) and (x2, y2) then the x co-ordinate of its intersect with row D which has integer value yD is given by $$xD=(yD-y1)*(x2-x1)/(y2-y1)$$

it follows that the intersection with row D+1 is given by $$x(D+1)=xD+(x2-x1)/(y2-y1)=xD+xInc$$

where xInc is a constant increment for each successive row. Similarly if increment I2 has endpoint co-ordinates (x1', y1') and (x2', y2') then the x co-ordinate of its intersect with row D which has integer value yD is given by $$xD'=(yD-y1')*(x2'-x1')/(y2'-y1')$$

it follows that for the intersection of row D+1

$$x(D+1)'=xD'+(x2'-x1')/(y2'-y1')=xD'+xInc'$$

This provides a computationally effective way to compute the range of intersection for each row in turn. The intersections with the current row are computed by simply incrementing the intersections with the previous row.

First we must specify the range of rows that lie within the region. This is given by the range of integer y values that are common to both increments. These are the integer values in the range

[Ceiling(Max(y1, y1')), Floor(Min(y2, y2'))]=[Y1, Y2]

assuming that the orientation of the scanner with respect to the paper remains roughly vertical. This approach can easily be extended to allow the scanner to be at an arbitrary orientation with respect to the page. For example, if the scanner is inverted the linear sensor data can be reversed and the polarity of the end point position data reversed. Furthermore, if the angle of the scanner is more than 45% from vertical correct rectification can be achieved by flipping the polarity of both the x/y position co-ordinates and the rows and columns of the image. For ease of explanation, the discussion of the embodiments will only deal with the roughly vertical case, but extension to the more general cases indicated above is a straightforward matter for the person skilled in the art.

The active pixels in the region can be identified in turn using the following pseudo code

```
TRANSFORM LOOP 1
{
   //INITIALISATION
   y=Y1
   xInc=(x2-x1)/(y2-y1)
   xInc'=(x2'-x1')/(y2'-y1')
   xD=x1+(y-y1)*xInc
   xD'=x1'+(y-y1')*xInc'
   //MAIN LOOP
   while (y<=Y2)
   {
      [X1, X2]=[Ceiling(xD), Floor(xD')]
      x=X1
      //INNER LOOP
      while (x<=X2)
         VISIT PIXEL (x, y)
      xD+=xInc
      xD'+=xInc'
      y++;
   }
}
``` where operators floor and ceiling have their usual mathematical interpretations. The actual details of the initialisation and inner loop are specific to the different methods described below. For simplicity of presentation in the embodiments of TRANSFORM LOOP shown, the assumption is made that xD is always less than xD'. It is straightforward to extend this to the generic case by testing the order of xD and xD' on each row.

The next step is to determine which linear sensor pixels make a contribution to each rectilinear grid pixel and in what proportions. An embodiment of the PAIRWISE approach is now described.

Figure 19:
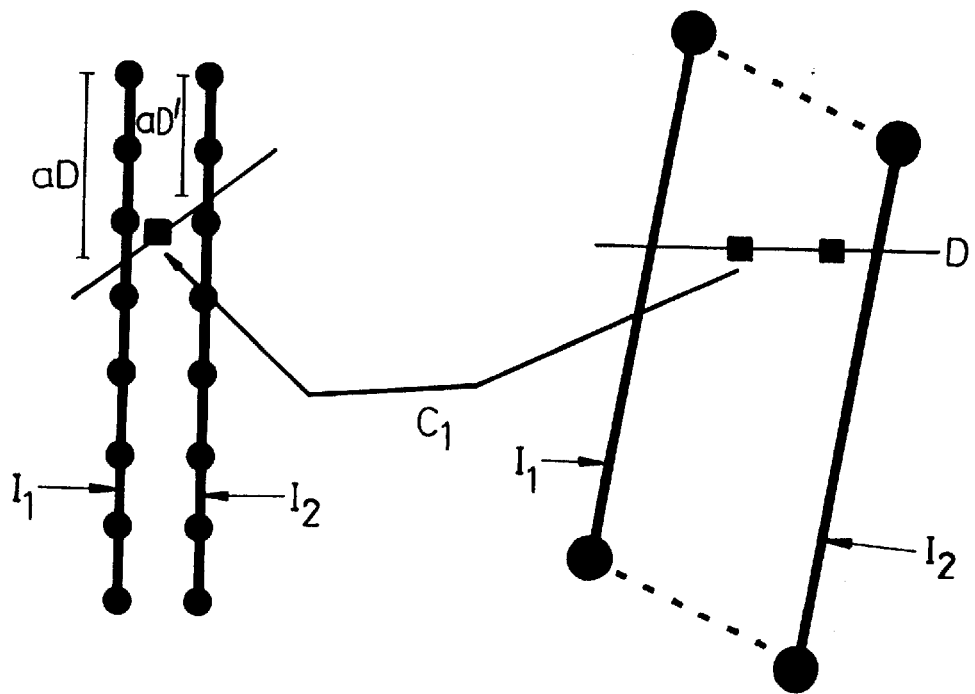
FIG. 19 shows the backmapping of a pixel in the rectilinear space of FIG. 18 on to a space defined by the two linear image sensor positions.

In this embodiment of the PAIRWISE approach to the method according to the invention, rectification is based upon an inverse mapping as used in computer graphics texture mapping (see for example Wolberg as referred to above at page 188) whereby each pixel in the interval delimited by the two lines that join the end point positions of the increments I1 and I2 is mapped backwards into a sub pixel location within a co-ordinate space defined between the pair of increments themselves. This situation is illustrated in FIG. 19 where the pair of increments I1 and I2 shown mapped into the rectilinear image in FIG. 18 also define a simple increment space where units are linear sensor pixel spacing, the increments align with the y axis and the increments are placed a unit pixel apart. Within this space the top sensor element of the left hand increment has co-ordinates (0, 0).

The pixel C1 from the rectilinear image is shown mapped between the increments I1 and I2. It has sub-pixel co-ordinates (x, Y.y) where Y is the integer component of the co-ordinate along the increment and x and y are the sub-pixel offset. A representative pixel value can then be determined using bilinear interpolation of the four surrounding pixels. That is:

$$BiLinear(I1,I2,Y,y,x)=I1[Y]*(1-x)*(1-y)+I2[Y]*(1-y)*x+I1[Y+1]*(1-x)*y+I2[Y+1]*x*y$$

The best approximation to the transform from the rectilinear image to the space between increments involves the solution of a quadratic for every pixel. This is not a satisfactory practical solution because of the expense of computation involved. While it is possible to derive approximate linear homogeneous mappings from rectilinear image co-ordinates to the co-ordinate space defined by a pair of increments, a non-homogeneous solution is preferable. With such a non-homogeneous solution no assumptions about the nature of the local transformation are required. It is also possible to solve easily for corner cases, such as when the projection of an adjacent pair of increments involves a cross-over in the rectilinear image space.

In such a non-homogeneous method, a different mapping is defined for each row of the rectilinear image in the interval [Y1, Y2]. This is again determined from the intersection of that row with the lines that connect the end-point positions. In this case, the distance of the intersection point along the line itself is recovered. This corresponds, after any scaling required for the differences in resolution, to a physical position along the linear sensor. In FIG. 19 aD and aD' are the intersection along increments I1 and I2 respectively for rectilinear row D; where from simple geometry $$aD=(yD-y1)*(N-1)/(y2-y1)$$

and $$aD'=(yD-y1')*(N-1)/(y2'-y1')$$

it follows for the intersection of row D+1

$$a(D+1)=aD+(N-1)/(y2-y1)=aD+aRowInc$$

and $$a(D+1)'=aD'+(N-1)/(y2'-y1')=aD+aRowInc'$$

which again gives a simple recurrence relationship for each successive row for efficient serial implementation.

Each pixel in the rectilinear image along row D in the interval [X1, X2] maps to a different point along a line in the increment space that joints the two points of intersection at (0, aD) and (1, aD') respectively. Assuming a linear mapping along this row the pixel at location (xE, yD) in the rectilinear image will map to location (aE, bE) in the increment space where:

$$aE=aD+(xE-xD)*(aD'-aD)/(xD'-xD)$$

and $$bE=(xE-xD)/(xD'-xD)$$

and again it follows for the next pixel along row D that $$a(E+1)=aE+(aD'-aD)/(xD'-xD)=aE+aInc$$

and $$b(E+1)=bE+1/(xD'-xD)=bE+bInc$$

Where the intensity at (aE, bE) is determined by the bilinear interpolation. The additional initialisation and modified inner loop of TRANSFORM LOOP are
TRANSFORM LOOP 2
{
    //INITIALISATION
    y=Y1
    xInc=(x2-x1)/(y2-y1)
    xInc'=(x2'-x1')/(y2'-y1')
    xD=x1+(y-y1)*xInc
    xD'=x1'+(y-y1')*xInc'
    aRowInc=(N-1)/(y2-y1)
    aRowInc'=(N-1)/(y2'-y1')
    aD=(y-y1)* aRowInc
    aD'=(y-y1')*aRowInc'
    //MAIN LOOP
    while (y<=Y2)
    {
        [X1, X2]=[Ceiling(xD), Floor(xD')]
        x=X1
        aInc=(aD'-aD)/(xD'-xD)
        bInc=1/(xD'-xD)
        a=(x1-xD)*aInc
        b=(x1-xD)*bInc
        //INNER LOOP
        while (x<=X2)
        {
            A=Floor(a)
            pixel[y][x]=BiLinear(I1, I2, A, a-A, b)
            a+=aInc
            b+=bInc
        }
        xD+=xInc
        xD'+=xInc'
        aD+=aRowInc
        aD'+=aRowInc'
        y++;
    }
}

More direct geometrical interpretation can also be used in other embodiments of the method according to the invention to perform PAIRWISE rectilinear pixel interpolation. Such methods do not require the explicit mapping of rectilinear image pixels back into an increment co-ordinate space.

One particularly simple embodiment having reduced computational requirements with respect to the back projection approach is to perform interpolation along each increment and then interpolate these values directly in the rectilinear image. Better image quality can be achieved, at the cost of increased computation, by mapping each rectilinear image pixel to the closest point on each of the increments. These are the points on the increments whose interpolated (along the linear sensor) intensity best reflects the intensity of the rectilinear pixel under consideration. The pair of interpolated increment intensity values are then combined, again using a linear interpolation, to give the best representative intensity for the pixel. Such embodiments are described in European Patent Application No. 97302519.0.

Next further embodiments of a rectification approach employing the CHUNKWISE method of rectilinear mapping will be presented. The CHUNKWISE approach has the twin advantages that the outer loop of the appropriate version of TRANSFORM LOOP is computed less frequently and that larger numbers of output pixels are accessed sequentially which leads directly (without the need for a cache) to improved memory bandwidth.

Figure 20:
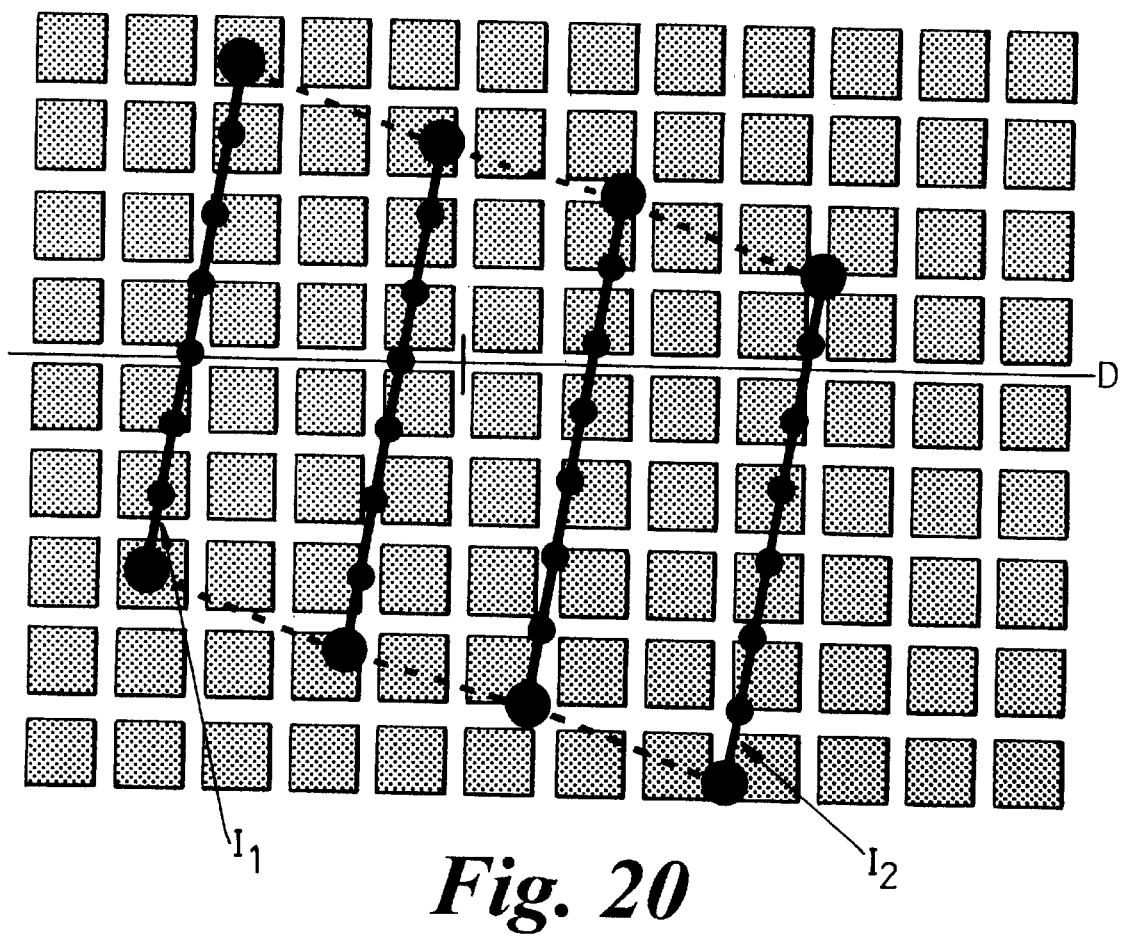
FIG. 20 shows a portion of the rectilinear image space of FIG. 17 defining the scanned image with a series of linear image sensor positions mapped thereon.
Figure 21:
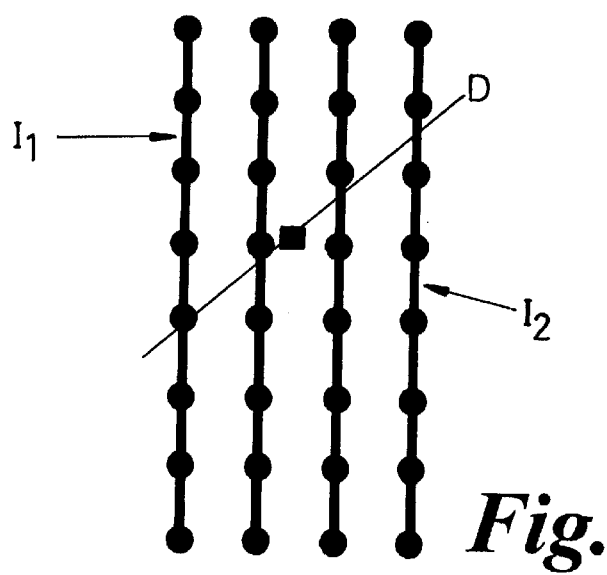
FIG. 21 shows the backmapping of a pixel in the rectilinear space of FIG. 20 on to a space defined by the linear image sensor positions.

FIG. 20 shows a chunk consisting of M, in this case 4, increments. The outer pair of increments, labelled I1 and I2, are again used by the outer loop of TRANSFORM LOOP to identify valid pixels that map within the chunk. Preferred embodiments determine rectilinear array pixel values with an extended form of non-homogeneous back projection algorithm as described previously for the PAIRWISE case. FIG. 21 shows the transformation of a row labelled D in FIG. 20 into an increment space that contains the 4 increments bounded by I1 and I2. It joins the points of intersection of row D with each of the outer increments. Following on from the PAIRWISE case, as shown in FIG. 19, these intersections have offset distances along the linear sensor of aD and aD' respectively for I1 and I2. The co-ordinates of the intersection points in the increment space are thus (0, aD) and ((M−1), aD').

Each pixel in the rectilinear image along row D in the interval [X1, X2] maps to a different point along a line in the increment space that joins the two points of intersection at (0, aD) and ((M−1), aD') respectively. Assuming a linear mapping along this row the pixel at location (xE, yD) in the rectilinear image will map to location (aE, bE) in the increment space where:

$$aE=aD+(xE-xD)*(aD'-aD)/(xD'-xD)$$

and $$bE=(M-1)*(xE-xD)/(xD'-xD)$$

and again it follows for the next pixel along row D that $$a(E+1)=aE+(aD'-aD)/(xD'-xD)=aE+aInc$$

and $$b(E+1)=bE+(M-1)/(xD'-xD)=bE+bInc$$

Where the intensity at (aE, bE) is determined by the bilinear interpolation.

Hence TRANSFORM LOOP becomes:
TRANSFORM LOOP 3
{
//INITIALISATION
y=Y1
xInc=(x2-x1)/(y2-y1)
xInc'=(x2'-x1')/(y2'-y1')
xD=x1+(y-y1)*xInc
xD'=x1'+(y-y1')*xInc'
aRowInc=(N-1)/(y2-y1)
aRowInc'=(N-1)/(y2'-y1')
aD=(y-y1)*aRowInc
aD'=(y-y1')*aRowInc'
//MAIN LOOP
while (y<=Y2)
{
  [X 1, X 2]=[Ceiling(xD), Floor(xD')]
  x=X1
  aInc=(aD'-aD)/(xD'-xD)
  bInc=(M-1)/(xD'-xD)
  a=(x1-xD)*aInc
  b=(x1-xD)*bInc
  //INNER LOOP
  while (x<=X 2)
  {
    A=Floor(a)
    B=Floor(b)
    pixel[y][x]=BiLinear(IB, IB+1, A, a-A, b-B)
    a+=aInc
    b+=bInc
  }
  xD+=xInc
  xD'+=xInc'
  aD+=aRowInc
  aD'+=aRowIInc'
  y++;
}
}
Where IB is the B'th increment in the chunk and IB+1 is the (B+1)'th increment in the chunk.

The CHUNKWISE method relies on the fact that scan path is almost uniform and only smoothly changing. This must be true both spatially (the scan should be a uniform shape) and in terms of the sampling frequency along the scan path (the scan should be sampled uniformly). The CHUNKWISE method is particularly well adapted for use with the tiling method illustrated in FIG. 14. If the increment hold buffer 232 is adapted to hold (S+1) increments, then uniform chunks with (T+1) increments can be employed, where T is an integer factor of S. For example, if 33 increments are held in increment hold buffer 232, then uniform rectification chunks can be formed of any of 2 (the PAIRWISE limit), 3, 5, 9, 17 or 33 increments. The rectification step will then occur S/T times between each successive replenishment of the increment hold buffer 232.

Also possible is the extension of the CHUNKWISE method by variation of the chunk-size dynamically depending upon the degree of uniformity of the scan path. Where uniformity is good, a large chunk can be accommodated without introduction of image distortion, but where the scan path or sampling regime were to vary rapidly, only a small chunk-size could be accommodated without introducing artefacts. In the limiting case, such embodiments revert to a PAIRWISE method.

As has been discussed above, the rectilinear image space available to memory can easily accommodate a single letter sized or A4 sized page at the resolution of the linear sensor (typically either 200 or 300 dpi). As there is no dimensional restriction to the rectilinear image space, the final image will be well formed independent of the initial starting position or the scan path. To obtain proper alignment, either the scan must begin at the assumed orientation (e.g. always parallel to the side of the page) or orientation must be recovered from the content of the scan and be used to reorient the final image. Methods for automatically determining the dominant orientation of text on a page, which can be used as a basis for the latter, are known in the literature eg. "The Skew Angle of Printed Documents" by H. S. Baird. Proc 4th SPSE Conference Symposium on Hybrid Image Systems, Rochester, N.Y. 1987.

The next step is to stitch successive image swaths within their region of overlap. The aim is to combine multiple swaths so that the result is a final rectified reconstructed image stored in tiled form—advantageously, this image will also be compressed. This should be done in such a way as to identify and correct most of the accumulated navigation error and to mask any residual error.

In the embodiments to be described, the stream of navigation data provides the registration information needed for stitching. Since the navigation signal tends to accumulate error, it is continually amended by feeding back a correction signal derived from analysis of feature offsets.

However, first we will describe a method of stitching image swaths which assumes that there are no navigation errors.

Some area of overlap is necessary in order to stitch two image swaths. Swaths are delimited by a reversal in the path of the scanning device back over a region of the original of which a part has just been scanned. A swath comprises the image data captured during a scanning swipe across an original being scanned. In the following description, the term 'swath' will also sometimes be used to refer to the part of the reconstructed image formed from mapping such data.

Figure 22:
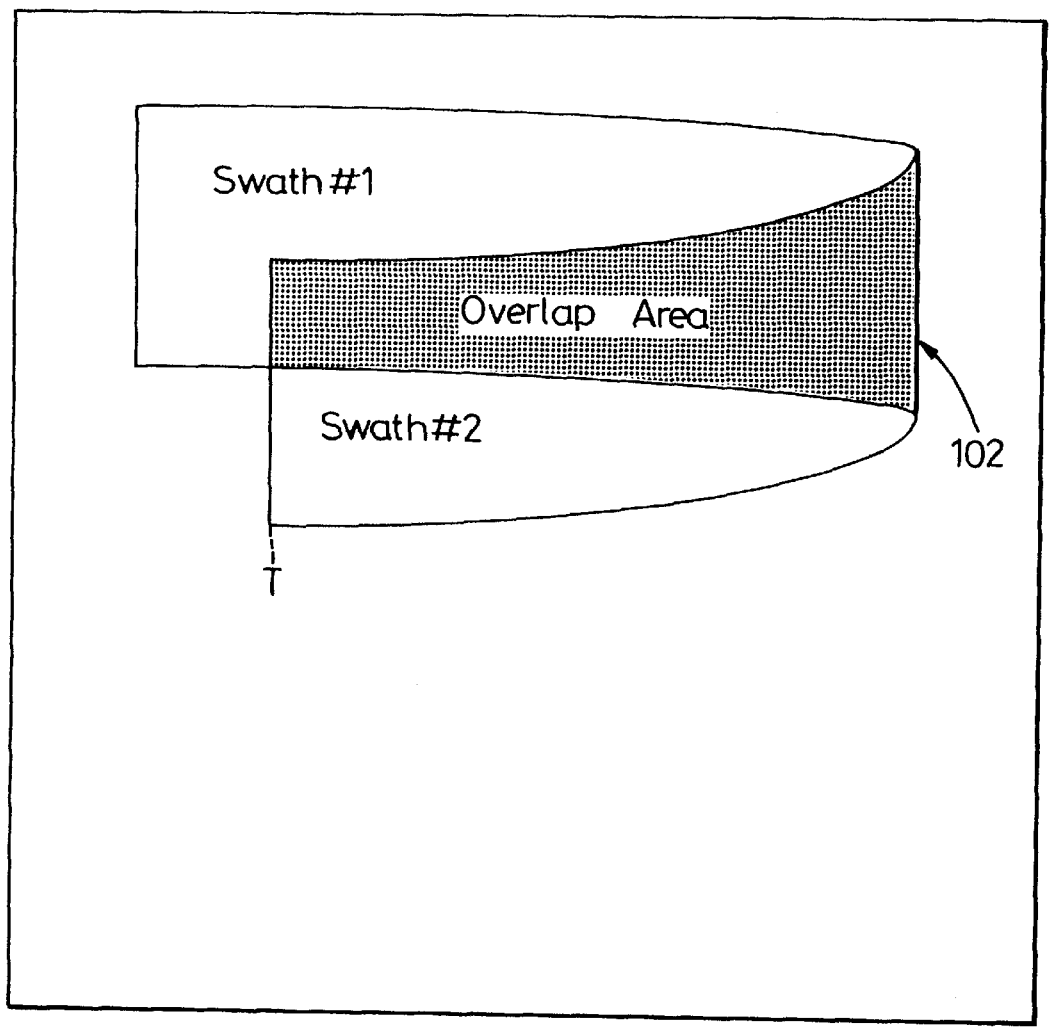
FIG. 22 shows collection of swathes by the scanning device of FIG. 1.

The scan represented by the loci of endpoints of increments in FIG. 17 generates two overlapping swaths. In FIG. 22 the portion mapped into the rectilinear image space that comprises Swath #1 is partially re-mapped on the return by the portion of the scan that corresponds to Swath #2, with the area of overlap 102 shown filled. At a time T, a partial swath has thus far been scanned. Satisfactory stitching can be achieved, in this case, by simply continuing to map Swath #2 to the rectilinear image space on top of Swath #1. Returning to FIG. 17, Increment #2 can be mapped along its whole length in just the same way as for Increment #1 and similarly for each pixel in the region of overlap 102 in FIG. 22. The final rendition in the rectilinear image space that resulted from Swath #1 is simply replaced with that resulting from Swath #2.

In this event, the method set out with regard to FIG. 14 will need to be amended to allow the content of a no longer active, and hence compressed, tile to be replaced—this is likely to require additional memory for the storage of compressed tiles, as if memory is allocated to compressed tiles by the tile compressor 238 according to the memory required by each tile, difficulties will result if the second version of the tile requires more memory after compression than the first version. Difficulties may also occur in the case of tiles only partially filled in the first swath, but rendered inactive (tiles at the edge of the linear sensor). If these are compressed on the first pass, a second "full" version will clearly take up more memory. A possible approach is never to compress a tile which is not filled—partially filled tiles can be checked for by evaluation of each corner of the tile to determine whether information has been written to it at the compression stage. Partially filled tiles could then be deleted when they become inactive (relying on swath overlap to obtain a complete image), or stored in a separate memory area.

A scheme in which pixels in the area of overlap 102, mapped as filled tiles in Swath #1, are not replaced by those mapped by Swath #2, will pose fewer difficulties in the tiling approach, provided that all pixels mapped by Swath #2 that are not part of the overlap (i.e. are not also mapped by Swath #1) are properly mapped. That is to say, the region mapped by Swath #1 is used to clip the region mapped by Swath #2. In principle, provided that Swath #1 and Swath #2 correctly map all pixels that lie outside the overlap region, then the pixels in the overlap region can be obtained equally from either Swath #1 or Swath #2, or a combination.

In practice, due to the accumulation of errors between the position tags of Swath # 1 and Swath #2, this simple approach which assumes no navigation errors does not give very good results.

Figure 23:
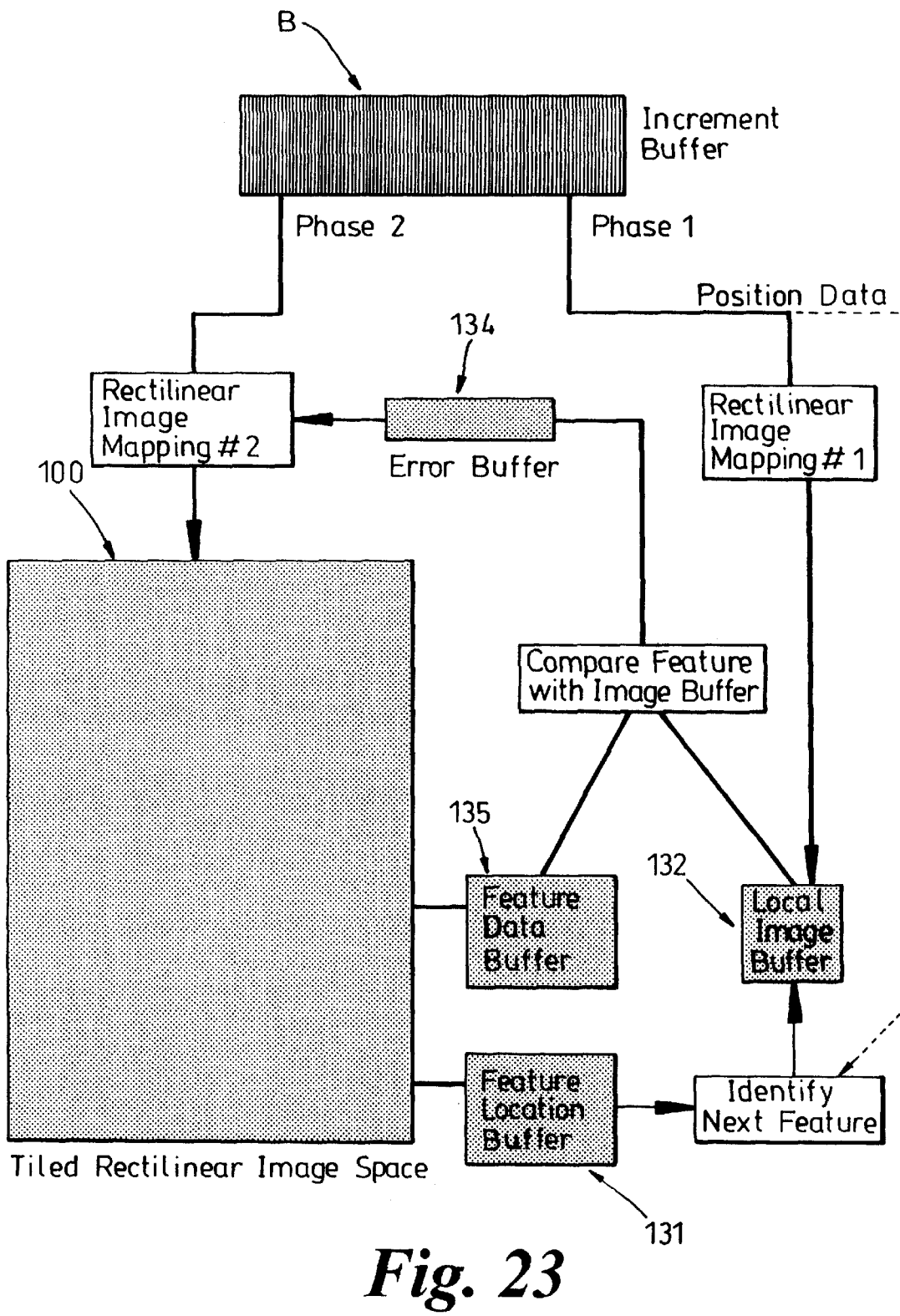
FIG. 23 shows the buffers used in a two stage process for the stitching of successive swathes.
Figure 24:
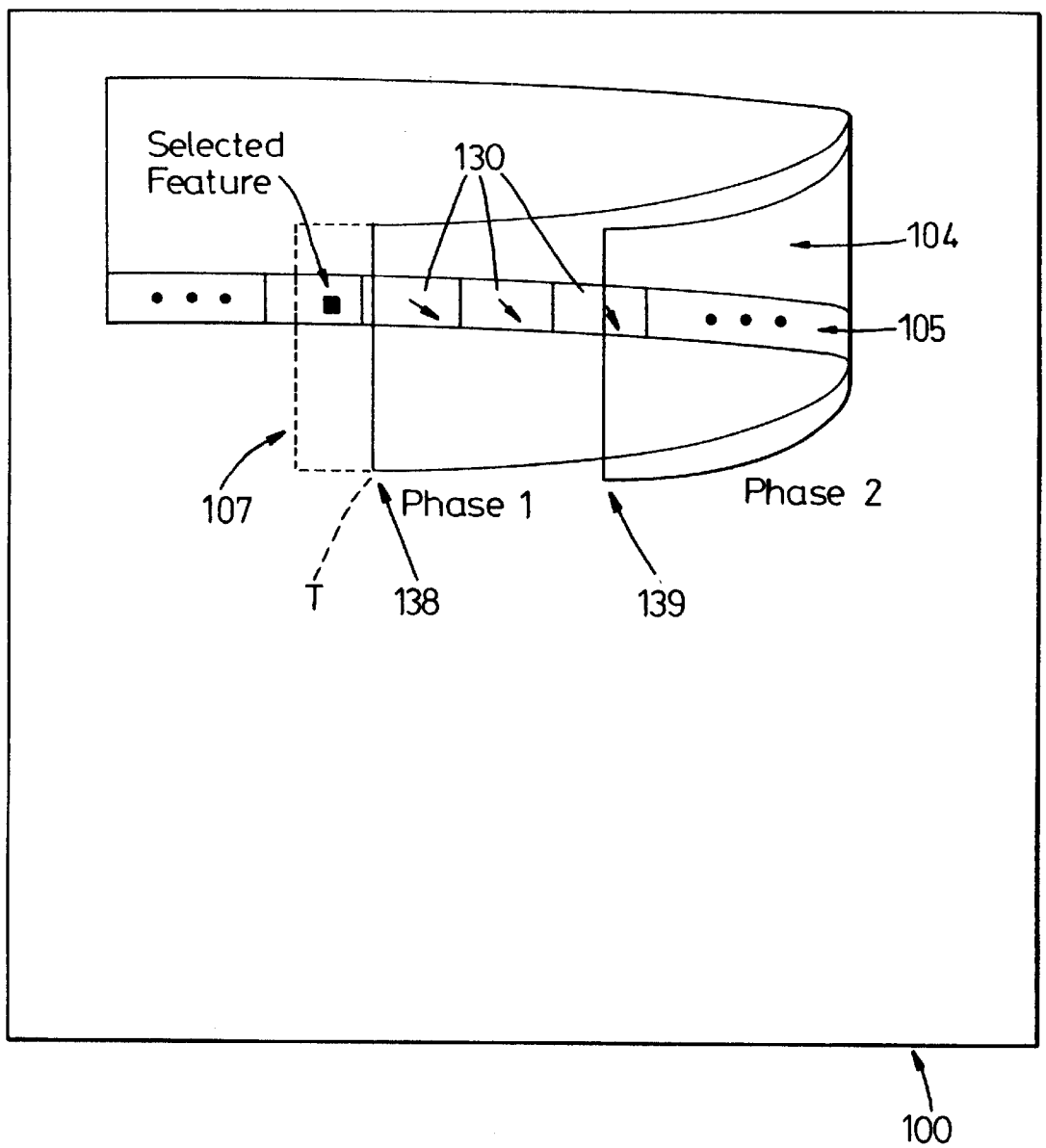
FIG. 24 illustrates swathes being collected when the two stage process of FIG. 23 is in use.

An embodiment of an approach to stitching in accordance with the present invention will now be described with reference to FIGS. 23 and 24. FIG. 23 indicates the processing stages and data buffers involved while FIG. 24 relates to the process utilised with respect to Swath #1 and Swath #2. The image increment data is mapped to the tiled rectilinear image space as described previously. FIG. 24 shows use of the image captured in Swath #1 in mapping on to the rectilinear image space of the return pass, Swath #2. Navigation correction is calculated by correlating features within the area of overlap between Swath #1 and Swath #2.

FIG. 24 highlights this overlap area which is divided into two parts 104 and 105. As shown in FIG. 24, during collection of Swath #1, quadrilateral image segments 130 (henceforth called "registration tiles") are periodically labeled along the lower edge of the swath in the overlap area 105. On a later pass (Swath #2) the overlap area 104 of Swath #2 above the area 105 containing the registration tiles 130 of Swath #1 is clipped, i.e. discarded, as Swath #2 is acquired, by not permitting those filled tiles provided by Swath #1 to be overwritten. The registration tiles 130 from Swath #1 are located in the top of what remains of Swath #2, after the overlap area 104 has been clipped. If the navigation data is perfect, there will be no offset between the location of a registration tile 130 and the location of that tile's rescanned image in Swath #2. More realistically, some navigation error will have accumulated since the last registration was performed. The offset between the appearance of this tile in the two swaths produces a correction factor which is then used to update future navigation position-tags associated with the image data, in order to minimize the total accumulated error. In this way the total accumulated error in the navigation data is prevented from growing so large that it introduces an obvious distortion in the region where the swaths overlap.

Navigation error can be minimised by beginning to stitch Swath #2 to Swath #1 from the point where these swathes are closest in the stream of increments. The navigation errors should be least between these closely spaced increments in a scan sample. Continued use of matching around a "turning point" between successive swathes (where obtained, as is advantageous, according to the capture approach shown in FIG. 1), together with progressive use of detected error between swaths being stitched together to predict and process error further along the swathes, allow self-guiding control of the stitching in a manner essentially analagous to the closure of a zip or zipper.

The processing stages for stitching Swath #1 to Swath #2 will now be described with reference to FIGS. 23 and 24. FIG. 23 shows the image increment buffer B and the tiled rectilinear image space 100. FIG. 23 also shows a feature location buffer 131 and an image buffer 132. An arrangement of this type is shown in International Patent Application Publication No. WO 96/27257. However, in the tiled scheme described here an additional feature data buffer 135 is required. When a registration tile 130 is constructed, it is necessary to obtain a copy of the image tile containing that registration tile. This is because when such image tiles become inactive, they will be compressed by compresser 238 and the data they contain will no longer be readily available for stitching. It is thus advantageous to copy these tiles in uncompressed form to the additional feature tile buffer, with a pointer to each relevant tile in the additional feature data buffer 135 from the feature location buffer 131. The processing stages are as follows:

1. As mentioned above, during collection of Swath #1, registration tiles (130) are periodically labeled along the lower edge of the swath in the overlap area 105. An entire registration tile could be used for the correlation described above, but in the preferred embodiment a small area of high-frequency contrast (henceforth called a "registration feature") consisting of a rectangular tile (e.g., 15×15 pixels) of grey scale image is located within a registration tile forming part of the image being reconstructed in the tiled rectilinear image space 100 as a result of the capture of Swath #1. Image tiles containing these registration tiles 130 are copied to the additional feature data buffer 135 before such image tiles are compressed, in embodiments where compression is provided as indicated in the method of FIG. 14.

2. The position tags of the registration features (which define the position of each registration feature within the tiled rectilinear image space 100) are saved in the feature location buffer 131 prior to the start of the mapping of Swath #2 into the rectilinear image space 100.

3. As Swath #2 is mapped, registration feature locations are identified in advance of that region of the rectilinear image space being written to by Swath #2. This is achieved by defining a rectangular capture window 107, indicated in FIG. 24 with a length equal to an image increment and a width of a few pixels, which precedes the image increment of Swath #2 which is currently undergoing mapping into the rectilinear image space 100. When a registration feature location stored in the feature location buffer 131 falls within the capture window 107, the registration feature location is selected (only one registration feature location may be selected at any one time).

4. The selected registration feature location is used to define the predicted location of the registration feature when Swath #2 is mapped into the rectilinear image space. Navigation errors found with respect to previous registration features are taken account of by using the current error estimate (stored in an error buffer 134) to predict the location of the current registration feature. Hence, the search area used to locate the current registration feature then need only be large enough to account for the possible error increment.

5. The special image buffer 132 is used to store temporarily, directly from increment buffer B, a rectilinear image mapping of the image data of Swath #2 located around the selected registration feature location as well as storing the registration feature location. In other words, at time T, the image increment 138 shown in FIG. 24 is mapped into the buffer 132. The size of the special image buffer 132 must be adequate to store the registration feature plus the required search area, the size of which is calculated according to known error estimation algorithms.

6. The image fragment from Swath #2 stored in the special image buffer 132 is then compared with the corresponding image fragment stored in the feature data buffer 135 pointed to by the feature location buffer 131 for the relevant registration tile 130. In this way, an offset is obtained which, when accumulated with the previous error estimate, gives an updated estimate of navigation error. This updated estimate is stored in the error buffer 134 along with a position tag.

The position tag of the error estimate is simply the location, with respect to the rectilinear image space, of the centre of the current registration feature. It is used in turn to determine the increment in the increment buffer B to which the error estimate relates (i.e. the first increment corresponding to Swath #2 which maps to that image location). This indicates the increment by which the measured error estimate should be fully accommodated.

While other correlation approaches could be employed, an acceptable approach for calculation of the offset between two image fragments is a "sum of squared difference" correlation. A small search area is defined around the original location of the feature and correlation coefficients are determined by equation:

$$C_{k,l} = \Sigma_i \Sigma_j (T_{ij} - I_{i+k,j+l})^2$$

where $T_{ij}$ denotes the grey scale values of the feature from Swath #1 and $I_{i+k,j+l}$ denotes the greyscale values of the newly acquired feature from Swath #2. Indices i and j specify pixel locations within the features, while k and l specify the magnitude of the proposed translational offset (constrained to remain within the search space). The smallest element in the resulting correlation array denotes the offset between the two features. The registration feature within the registration tile is selected to maximize image variance, since this improves the accuracy of the correlation method. Details of the application of this approach are discussed further in International Patent Publication No. WO 96/27257.

In a second processing phase, the image data from Swath #2 is written into the rectilinear image space taking account of the error estimates at the recorded positions so as to remove those errors from the final reconstructed image. This is done by modifying the position data associated with the endpoints of the individual image increments of sensor data. This processing is advantageously completed, in the context of the FIG. 14 method, before determining which tiles are required as active tiles in a "bout" of tiling, rectification and compression.

This preferred approach gives improved stitching because errors in the positions of the navigation sensor travelling through the overlap region between swaths are identified and corrected for before the final image is reconstructed. In addition, error between the calculated positions of the top and bottom of the image increments which has accumulated during collection of the previous swath can be absorbed at once at the beginning of the next swath without introducing unwanted artefacts. This is indicated in FIG. 24 by the discontinuity between the right hand edges of the turning point between Swath #1 and Swath #2 derived from the first and second processing phases described above.

The stitching step may be implemented in different ways with regard to the nature of image capture (more specifically, but not exclusively, scanning) required. One alternative is to require scanning to be carried out from the top of a page to the bottom, in which case stitching need only ever be done between the bottom of one swath and the top of the next. Another approach is to allow scanning to start at any part of the page but to require the initial direction of scanning to be maintained. In that case, there must be the capability to identify registration features on both edges of swaths, but once the direction of scanning is established, error estimates need only be kept for one side of the current swath. In another approach, scanning may be permitted in any direction and changes in scanning direction can also be accommodated eg. a spiral scan. In this third approach, not only must there be the capability to identify registration features on both edges of swaths, but error estimates must be kept for both the top and bottom of each swath in case the direction of scanning should change. The latter approach gives the greatest flexibility for the user but has a higher computing overhead.

In a preferred embodiment, the processing electronics for image reconstruction, stitching and image management is contained within the housing that defines the scanning device 10 of FIG. 1. Thus, the scanned image may be immediately presented at the image display 16. However, the scanning device may contain memory to store the position-tagged image data, but without processing and file management electronics and firmware.

As noted in reference to FIG. 3, the navigation and imaging sensors 22, 24 and 26 are preferably mounted on a pivoting member 20. In one embodiment, the pivoting member is connected to the remainder of the housing by at least one elastomer for which one end of the elastomer is connected to the stationary portion of the housing and the other end is connected to the pivoting member. The elastomer acts as a hinge. Thus, the pivoting portion is allowed to "float" without the use of frictional elements. Power, control and data signals may be conducted to the sensors via flex cables that are shielded in order to minimize electromagnetic interference. Other methods of pivotally attaching the pivoting member can be used. If the pivoting member is deleted and the sensors are in a fixed position on the housing, care must be taken no to tilt the scanning device 10 excessively during image capture. In this embodiment, the design of illumination and optical elements must be given increased attention.

While the invention has been described and illustrated as one in which a planar original is scanned, this is not critical. In fact, persons skilled in the art will readily understand how many of the techniques may be used for scanning three-dimensional images. However, the preferred embodiment is one in which the image of interest is formed on a medium, such as a piece of paper, a transparency, or a photograph, and the scanning device is in contact with the medium.

As indicated above, however, in another aspect the invention is equally applicable to image capture of a different kind. The invention can equally be applied to capture of image data with an area sensor, such as a conventional digital camera. For capture of a large image at increased resolution with a digital camera, an effective approach is to scan across the image taking a series of image frames each capturing a part of the large image, oversampling so that there will be areas of overlap between different image frames captured by the digital camera, and then establishing relative positions between the different elements by using these areas of overlap. From these relative positions the image can then be reconstructed according to the method of the invention—no separate position sensor is thus required. It would of course be possible to provide a position sensor with an area image sensor, but in this case the first aspect of the invention described with respect to the preferred embodiment is entirely applicable—however, in some capture regimes, use of such a position sensor may be expensive, inconvenient, or even impossible.

The step of determining relative positions will now be discussed. While the skilled man will appreciate that it is possible to address more complex situations, the most straightforward applications of this approach are to situations where a single global transformation with only a few parameters can be used to relate the position of one image in a sequence with respect to neighbouring images in a sequence. This will apply if the image to be captured is planar (for example, a flat document or a whiteboard) or effectively planar (landscapes where features are very distant with respect to the movement of the area sensor). It will also apply irrespective of the content of the scanned scene if the motion of the sensor is (or is very close to) a rotation about the optical centre of the imaging device—as would often be the case for capture of a panorama from a sequence of discrete snapshots. As indicated above, no position data is required on capture—it is only appropriate to know which image frames are spatially adjacent (though this could if necessary be calculated by a more extensive feature matching step).

Relative positions can be determined in each of the above situations by, for example, the class of 2D planar projective transformations. The generic transformation has 8 parameters and has the form $$x' = \frac{m_0 x + m_1 y + m_2}{m_6 x + m_7 y + 1}$$

where (x,y) are the co-ordinates of a first image, (x',y') are the co-ordinates of the second image, and ($m_0$, $m_1$, $m_2$, $m_3$, $m_4$, $m_5$, $m_6$, $m_7$) are the parameters of the transform.

As the skilled man will appreciate, methods to determine this transformation abound in the technical literature of image processing. As indicated above, the central idea is the use of the overlapping portion between a pair of images to determine the relative transformation that exists between the images as a whole. Successive images can then be transformed and composited with respect to a single global co-ordinate frame. An example of this approach is given in "Video Mosaics for Virtual Environments" by Richard Szeleski, IEEE Computer Graphics and Applications, March 1996, pp 22–30 and the references cited therein.

Once the image frames are composited with respect to a global co-ordinate frame, it is then possible simply to adopt the tiling scheme indicated above and a method essentially as indicated in FIG. 14 to achieve a tiled image.

What is claimed is:

1. A method of reconstructing an image from a plurality of discretely captured image elements, each image element comprising image data captured in an image sensor and position data indicating a position of that image element with respect to others of the image elements, the method comprising:
    defining a reconstruction space having a plurality of tile locations, each tile location comprising a pixel grid of predetermined dimension representing a specific spatial region of the image in the reconstruction space;
    mapping each image element onto one or more tiles in appropriate tile locations in the reconstruction space to provide a reconstructed image in the form of a plurality of tiles.

2. A method as claimed in claim 1, wherein the position data is derived from navigation means which provides the position data for an image element on capture of that image element by the image sensor.

3. A method as claimed in claim 1, wherein the position data is derived from a preceding step of determining from features of the image elements a relative position for each image element with respect to others of the image elements.

4. A method as claimed in claim 1, wherein said tiles are contiguous and do not overlap.

5. A method as claimed in claim 4, wherein said tiles are adapted to tessellate in two dimensions.

6. A method as claimed in claim 2, wherein the image is captured in the form of a stream of sensor readings, each sensor reading comprising image data and corresponding position data.

7. A method as claimed in claim 6, comprising the repeated steps of:
    managing tiles by determining from the position data if tiles exist at tile locations corresponding to the spatial positions of one or more input sensor readings in the image, and by creating one or more new tiles as necessary so that tiles corresponding to the spatial positions of the one or more sensor readings exist; and
    writing to tiles by assigning pixel values to the pixels of tiles corresponding to the spatial positions of the one or more input sensor readings on the basis of the image data and the position data.

8. A method as claimed in claim 7, wherein said one or more sensor readings comprise a group of sensor readings, and wherein said steps of managing tiles and writing to tiles are repeated for successive groups of sensor readings.

9. A method as claimed in claim 8, wherein the step of managing tiles takes place for N successive sensor readings before the step of writing to tiles, and wherein the step of writing to tiles takes place for groups of M successive sensor readings, wherein N and M are positive integers greater than 1, (N−1)/(M−1) is a positive integer, and where the step of writing to tiles takes place (N−1)/(M−1) before a further tile managing step.

10. A method as claimed in claim 1, comprising creating a tile index indexing each tile created with its specific spatial region of the image.

11. A method as claimed in claim 10, wherein said tile index is provided as a tree, with each node of the tree pointing to a plurality of locations at a multiple of the spatial resolution of that node.

12. A method as claimed in claim 11, wherein each node points to four locations at twice the spatial resolution of that node.

13. A method as claimed in claim 7, wherein an active tile buffer is provided for storage of tiles in the tile managing step for tiles corresponding to the spatial positions of the one or more sensor readings operated on in the tile managing step.

14. A method as claimed in claim 7, wherein in the tile managing step some or all existing tiles not corresponding to the spatial positions of the one or more sensor readings are compressed.

15. A method as claimed in claim 14, wherein said one or more sensor readings comprise a group of sensor readings, and wherein said steps of managing tiles and writing to tiles are repeated for successive groups of sensor readings, and wherein in the tile managing step the tiles corresponding to the spatial positions of the previous group operated on are compared with the tiles corresponding to the spatial positions of the present group, and wherein newly required tiles are created and wherein tiles of the previous group not present in the present group are compressed.

16. A method as claimed in claim 14, wherein the tiles which are compressed are written to a compressed tile storage area.

17. A method as claimed in claim 13, wherein an active tile index is provided for reference to tiles in the tile writing step.

18. A method as claimed in claim 2, wherein the navigation means comprises one or more sensors for detecting inherent structure-related properties of a medium carrying the image captured.

19. A method as claimed in claim 1, wherein the sensor is comprised in a scanning device.

20. A method as claimed in claim 1, wherein the method is adapted for use with a sensor capable of unconstrained movement across the image captured.

21. A scanning system comprising:

an image capture device for discrete capture of a plurality of image elements, the image capture device comprising an image sensor wherein each image element comprises image data captured in the image sensor and position data indicating a position of that image element with respect to others of the image elements; and a signal processor adapted to reconstructing the image from the plurality of image elements, wherein the signal processor defines a reconstruction space in the form of a plurality of tiles, each tile comprising a pixel grid of predetermined dimension representing a specific spatial region of the image, and wherein the signal processor is maps each image element onto one or more tiles in appropriate tile locations in the reconstruction space to provide a reconstructed image in the form of a plurality of tiles.

22. A scanning system as claimed in claim 21, wherein the image capture device further comprises a navigation means which provides the position data for an image element on capture of that image element by the image sensor.

23. A scanning system as claimed in claim 21, further comprising a means for determining from features of the image elements a relative position for each image element with respect to others of the image elements.

24. A scanning system as claimed in claim 22, wherein the image capture device is adapted to capture a stream of sensor readings, each sensor reading comprising image data and corresponding position data.

25. A scanning system as claimed in claim 22, wherein the navigation means comprises one or more sensors for detecting inherent structure related properties of a medium carrying the image captured.

26. A scanning system as claimed in claim 21, wherein the image sensor is capable of unconstrained movement across the image captured.

27. A scanning system as claimed in claim 21, wherein the image capture device and the signal processor are both comprised in a scanning device.

28. A scanning system as claimed in claim 21, wherein the image capture device is a scanning device and the signal processor is comprised within a computer system, wherein the scanning system further comprises a communications interface between the scanning device and the computer system for provision of the plurality of image elements from the scanning device to the computer system.

* * * * *